US006876933B2

(12) United States Patent
Yasui et al.

(10) Patent No.: US 6,876,933 B2
(45) Date of Patent: Apr. 5, 2005

(54) METHOD AND AN APPARATUS FOR ESTIMATING AN AMOUNT OF DRAWN AIR OF A CYLINDER OF AN INTERNAL-COMBUSTION ENGINE AND A METHOD AND AN APPARATUS FOR CONTROLLING THE AMOUNT

(75) Inventors: Yuji Yasui, Wako (JP); Yosuke Ishikawa, Wako (JP); Takahide Mizuno, Wako (JP); Michihiko Matsumoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/697,796

(22) Filed: Oct. 31, 2003

(65) Prior Publication Data

US 2004/0162681 A1 Aug. 19, 2004

(30) Foreign Application Priority Data

Nov. 1, 2002 (JP) ....................................... 2002-320362

(51) Int. Cl.[7] ............................ G01F 1/00; F02M 25/07

(52) U.S. Cl. ........................... 702/45; 702/47; 701/102; 123/568.16

(58) Field of Search ............................ 702/45, 47, 100; 701/102, 104, 115; 123/486, 491, 568.16

(56) References Cited

U.S. PATENT DOCUMENTS 6,321,732 B1 * 11/2001 Kotwicki et al. ...... 123/568.16
6,708,102 B2 * 3/2004 Jankovic et al. ............ 701/102

FOREIGN PATENT DOCUMENTS

JP 11-294231 10/1999

* cited by examiner

*Primary Examiner*—Bryan Bui
(74) *Attorney, Agent, or Firm*—Squire, Sanders & Dempsey L.L.P.

(57) ABSTRACT

A method and an apparatus for estimating an amount of drawn air of a cylinder and a method and an apparatus for controlling the amount of drawn air, are presented. An estimated value of an amount of drawn air of the cylinder, based on intake manifold pressure, is multiplied by a value of an identification parameter obtained by an adaptive observer, to obtain a final estimated value of an amount of drawn air of the cylinder. An accurate estimated value in a transient state as well as an estimated value not oscillating in a steady state can be obtained. Accordingly, accuracy of air-fuel ratio control can be remarkably increased.

28 Claims, 16 Drawing Sheets

METHOD AND AN APPARATUS FOR ESTIMATING AN AMOUNT OF DRAWN AIR OF A CYLINDER OF AN INTERNAL-COMBUSTION ENGINE AND A METHOD AND AN APPARATUS FOR CONTROLLING THE AMOUNT

BACKGROUND OF THE INVENTION

1. Field of the Invention

The present invention relates to a method and an apparatus for estimating an amount of drawn air of an internal-combustion engine. Further, the present invention relates to a method and an apparatus for controlling a value estimated by the above-mentioned method or apparatus for estimation, to a desired value. In particular, the present invention relates to a method and an apparatus for estimating an amount of drawn air, using an adaptive observer to identify a parameter and a method and an apparatus for controlling a value estimated by the above-mentioned method and apparatus for estimation, to a desired value.

2. Description of the Related Art

FIG. 1 shows a structure of an internal-combustion engine to which a method and an apparatus for estimating an amount of drawn air and a method and an apparatus for controlling a value estimated by the above-mentioned method and apparatus for estimation, to a desired value, according to the present invention, are applied. The internal-combustion engine in FIG. 1 is provided with charger comprising a turbine 2 and a compressor 1 and a flexible valve timing mechanism 8. The turbine 2 and the compressor 1 maybe mechanic or electrically connected. The flexible valve timing mechanism 8 may directly operate valves electrically or may electrically adjust valve operations carried out by mechanical cams. Further, in order to reduce emissions, the internal-combustion engine in FIG. 1 is provided with an airflow meter 3, an intake manifold pressure sensor (PB sensor) 6, a large area air-fuel ratio sensor (LAF sensor) 12, an oxygen sensor 15, a primary catalyst converter (highly heat-resistant and low thermal capacity CAT) 13 for early activation in sing stage and a main catalyst converter (high) cell density CAT) 14 for high cleaning-up ratio of emissions during a period after the engine has been warmed up. In FIG. 1, a charging pressure sensor, an electronically controlled throttle, an exhaust gas recycling valve, an injector, a combustion chamber and an ignition plug are represented respectively by reference numerals 4, 5, 7, 9, 10 and 11.

FIG. 2 shows an air-drawing section of the internal combustion engine. Air is fed through throttle 5 to the cylinder. FIG. 3 shows a relationship among an amount of air having passed through the throttle Gth, measured by the airflow meter 3, an amount of drawn air of the cylinder Gcyl, an amount of air firing the intake manifold Gb and an intake manifold pressure Pb measured by the intake manifold pressure sensor 6. FIG. 3 shows that an amount of air having passed through the throttle Gth will overshoot an amount of drawn air of the cylinder Gcyl, because of effect of fling the intake manifold. Accordingly, if an amount of air having passed through the throttle Gth is regarded as an amount of drawn air of the cylinder Gcyl to determine an amount of fuel to be injected, while the throttle is quickly moving, the air-fuel ratio will change as below. That is, the air fuel ratio will become too large (fuel is too rich) when the opening is increased and will become too small (fuel is too lean) when the opening is decreased. As a result, the cleaning-up ratio of a catalyst will be reduced Conventionally, an amount of drawn air of the cylinder Gcyl has been estimated as mentioned below. A change in an amount of air filling the intake manifold ΔGB is estimated based on a change ΔPB in intake manifold pressure Pb, using the following equations.

$$Pb(k)Vb=Gb(b)R\ Tb \tag{1}$$

$$\Delta Pb(k)Vb=\Delta Gb(k)R\ Tb \tag{2}$$

$$\Delta Gb(k)=\Delta Pb(k)Vb/(R\ Tb) \tag{3}$$

Vb, R, Tb and k respectively represent a volume of the intake manifold, the gas constant, gas temperature in the intake manifold and control time synchronized with intake stroke (TDC) of the cylinder. Tb is assumed to be constant.

A change in an amount of air filling the intake manifold ΔGb(k) is used to adjust an amount of air having passed through the throttle Gth(k) using the following equation to obtain an estimated value of an amount of drawn air of the cylinder Gcyl_hat(k).

$$Gcyl\_hat(k)=Gth(k)\cdot\Delta Gb(k) \tag{4}$$

However, an effective volume of the intake manifold which contributes to the effect of filling the intake manifold, will vary depending on increase or decrease in the throttle opening and a changing rate of the throttle opening. Further, compensation for the overshot of an amount of air having passed through the throttle Gth, might be excessive or insufficient, as shown in FIG. 4, depending on a change in a gas temperature Tb in the intake manifold. In order to deal with the problem, gain scheduling has been performed for a volume of the intake manifold, an estimated value of an amount of drawn air of the cylinder Gcyl_hat(k) has been limited within limits or a change ΔGb in an amount of air firing the intake manifold has been subjected to filtering. As a result, the number of setting parameters for the above-mentioned methods has been increased. In spite of the efforts, the above-mentioned methods cannot deal with variation between engines or sensor properties and secular variation.

Publication of Japanese Unexamined Patent Application (KOKAI) No. 11-294231 discloses a method in which an estimated amount of drawn air is obtained using fuzzy-neural network. Refer to FIGS. 9 and 10 of the application. However, even this method cannot resolve the above-mentioned problems.

Accordingly, there is a great need fir a method and an apparatus for estimating an amount of drawn air, which can deal with variation between engines or sensor properties and secular variation, without increasing setting parameters. There is also a great need for a method and an apparatus for controlling a value estimated by the above-mentioned method and apparatus for estimation, to a desired value.

SUMMARY OF THE INVENTION

In the present invention an adaptive observer is used to estimate an amount of drawn air of a cylinder.

Thus, use of an adaptive observer allows accurate estimation of an amount of drawn air of a cylinder, independently of a moving rate and a moving diction of the throttle. As a result control accuracy of an fuel ratio is increased so that hazardous sub in exhaust gases can be reduced. Further, use of an adaptive observer remarkably reduces enormous time and manpower for settings of algorithm for estimating an amount of drawn air, conventionally required A method for estimating an amount of drawn air of a cylinder of an internal combustion engine, according to an embodiment of the present invention, comprises the step of obtaining an estimated value of an amount of drawn air of the cylinder, based on a value of intake manifold pressure. The method further comprises the step of determining a value of an identification parameter using an adaptive observer in such a way that a product of the estimated value of an amount of drawn air of the cylinder, based on a value of intake manifold pressure and a value of the identification parameter, is made equal to a value of an amount of air having passed through the throttle. The method further comprises the step of multiplying the estimated value of an amount of drawn air of the cylinder, based on a value of intake manifold pressure, by the value of the identification parameter to obtain a final estimated value of an amount of drawn air of the cylinder.

An apparatus for estimating an amount of drawn air of a cylinder of an internal combustion engine, according to an embodiment of the present invention, comprises a module for obtaining an estimated value of an amount of drawn air of the cylinder, based on a value of intake manifold pressure to deliver the estimated value as an output. The apparatus further comprises a module for determining an identification parameter using an adaptive observer, based on a value of intake manifold pressure and an amount of air having passed through a throttle. The apparatus further comprises a multiplying module for multiplying the estimated value, by a value of identification parameter to obtain a final estimated value of an amount of drawn air of the cylinder. The adaptive observer determines a value of the identification parameter based on the estimated value of an amount of drawn air of the cylinder, in such a way that a product of the estimated value and a value of the identification parameter, is made equal to a value of an amount of air having passed through the throttle, to deliver the value of the identification parameter as an output.

A computer-readable medium, according to an embodiment of the present invention, has a program stored therein. The program is made to perform the step of obtaining an estimated value of an amount of drawn air of the cylinder, based on a value of intake manifold pressure. The program is made to further perform the step of determining a value of an identification parameter using an adaptive observer in such a way that a product of the estimated value of an amount of drawn air of the cylinder, based on a value of intake manifold pressure and a value of the identification parameter, is made equal to a value of an amount of air having passed through the throttle. The program is made to further perform the step of multiplying the estimated value of an amount of drawn air of the cylinder, based on a value of intake manifold pressure, by the value of the identification parameter to obtain a final estimated value of an amount of drawn air of the cylinder.

An apparatus for estimating an amount of drawn air of a cylinder of an internal combustion engine, according to an embodiment of the present invention, comprises means for obtaining an estimated value of an amount of drawn air of the cylinder, based on a value of intake manifold pressure to deliver the estimated value as an output. The apparatus further comprises means for determining an identification parameter using an adaptive observer. The apparatus further comprises means for multiplying the estimated value, by a value of identification parameter to obtain a final estimated value of an amount of drawn air of the cylinder. The adaptive observer determines a value of the identification parameter based on the estimated value of an amount of drawn air of the cylinder, in such a way that a product of the estimated value and a value of the identification parameter, is made equal to a value of an amount of air having passed through the throttle, to deliver the value of the identification parameter as an output.

An amount of air having passed through the throttle, measured by the airflow meter, will show an overshoot when the throttle opening rapidly changes and will oscillate when the throttle opening remains invariant. As a result, accuracy of air fuel ratio control is reduced. In the above-mentioned embodiment of the present invention, an estimated value of an amount of drawn air of the cylinder, based on intake manifold pressure, is multiplied by a value of an identification parameter obtained by an adaptive observer, to obtain a final estimated value of an amount of drawn air of the cylinder. The embodiment allows an accurate estimated value in a transient state as well as an estimated value not oscillating in a steady state. Accordingly, accuracy of air-fuel ratio control can be remarkably increased According to another embodiment of the present invention, when determining an identification parameter using an adaptive observer, an amount of lit of a exhaust gas recycling valve is further used for identification.

As recycling of waste gas is turned on or off an amount of air having passed through the throttle, changes rapidly. The identification parameter calculated by the adaptive observer shows oscillation because of occurrences of spike errors. As a result, a final estimated value of drawn air of the cylinder, will sometimes be oscillating. In the present embodiment, an amount of lift of a exhaust gas recycling valve is used to cancel spike errors, to prevent a final estimated value of drawn air of the cylinder, from being oscillating. Accordingly, accuracy of air fuel ratio control can be increased when recycling of waste gas is turned on or A method for estimating an amount of drawn air of a cylinder of an internal combustion engine, according to another embodiment of the present invention, comprises the step of obtaining an estimated value of an amount of drawn air of the cylinder, based on a value of intake manifold pressure. The method further comprises the step of obtaining an estimated value of an amount of recycled exhaust gas based on a value of intake manifold pressure, a value corresponding to pressure inside an exhaust manifold and a value of an amount of lift of an exhaust gas recycling valve. The method further comprises the step of determining values of first and second identification parameters using an adaptive observer, in a way shown below. A value obtained by subtracting a product of the estimated value of an amount of recycled exhaust gas and a value of the second identification parameter, from a product of the estimated value of an amount of drawn air of the cylinder, based on a value of intake manifold pressure and a value of the first identification parameter, is made equal to a value of an amount of air having passed through the throttle. The method further comprises the step of subtracting a product of the estimated value of an amount of recycled exhaust gas and the value of the second identification parameter, from a product of the estimated value of an amount of drawn air of the cylinder, based on a value of intake manifold pressure and the value of the fist identification parameter, to obtain a final estimated value of an amount of drawn air of the cylinder.

An apparatus for estimating an amount of drawn air of a cylinder of an internal combustion engine, according to the present embodiment comprises a module for obtaining an estimated value of an amount of drawn air of the cylinder, based on a value of intake manifold pressure, to deliver the estimated value of an amount of drawn air, as an output. The apparatus further comprises a module for obtaining an estimated value of an amount of recycled exhaust gas based on a value of intake manifold pressure, a value corresponding to pressure inside an exhaust manifold and a value of an amount of lift of an exhaust gas recycling valve, to deliver the estimated value of an amount recycled exhaust gas, as an output. The apparatus further comprises a module for determining first and second identification parameters using an adaptive observer to deliver values of the first and second identification parameters as outputs. The adaptive observer determines the identification parameters in a way shown below. A value obtained by subtracting a product of the estimated value of an amount of recycled exhaust gas and a value of the second identification parameter, from a product of the estimated value of an amount of drawn air of the cylinder, based on a value of intake manifold pressure and a value of the first identification parameter, is made equal to a value of an amount of air having passed through the throttle. The apparatus further comprises a module for subtracting a product of the estimated value of an amount of recycled exhaust gas and the value of the second identification parameter, from a product of the estimated value of an amount of drawn air of the cylinder, based on a value of intake manifold pressure and the value of the first identification parameter, to obtain and deliver as an output, a final estimated value of an amount of drawn air of the cylinder.

A computer-readable medium, according to the present embodiment, has a program stored therein. The program is made to perform the step of obtaining an estimated value of an amount of drawn air of the cylinder, based on a value of intake manifold pressure. The program is made to further perform the step of obtaining an estimated value of an amount of recycled exhaust gas based on a value of intake manifold pressure, a value corresponding to pressure inside an exhaust manifold and a value of an amount of lift of an exhaust gas recycling valve. The program is made to further perform the step of determining values of first and second identification parameters using an adaptive observer in a way shown below. A value obtained by subtracting a product of the estimated value of an amount of recycled exhaust gas and a value of the second identification parameter, from a product of the estimated value of an amount of drawn air of the cylinder, based on a value of intake manifold pressure and a value of the first identification parameter, is made equal to a value of an amount of air having passed though the throttle. The program is made to further perform the step of subtracting a product of the estimated value of an amount of recycled exhaust gas and the value of the second identification parameter, from a product of the estimated value of an amount of drawn air of the cylinder, based on a value of intake manifold pressure and the value of the fist identification parameter, to obtain a final estimated value of an amount of drawn air of the cylinder.

An apparatus for estimating an amount of drawn air of a cylinder of an internal combustion engine, according to the present embodiment, comprises means for obtaining an estimated value of an amount of drawn air of the cylinder, based on a value of intake manifold pressure, to deliver the estimated value of an amount of drawn air, as an output. The apparatus further comprises means for obtaining an estimated value of an amount of recycled exhaust gas based on a value of intake manifold pressure, a value corresponding to pressure inside an exhaust manifold and a value of an amount of lift of an exhaust gas recycling valve, to deliver the estimated value of an amount of recycled exhaust gas, as an output. The apparatus further comprises means for determining values of fist and second identification parameters using an adaptive observer to deliver the first and second identification parameters as outputs. The adaptive observer determines the identification parameters in a way shown below. A value obtained by subtracting a product of the estimated value of an amount of recycled exhaust gas and a value of the second identification parameter, from a product of the estimated value of an amount of drawn air of the cylinder, based on a value of intake manifold pressure and a value of the fist identification parameter, is made equal to a value of an amount of air having passed through the throttle. The apparatus further comprises means for subtracting a product of the estimated value of an amount of recycled exhaust gas and the value of the second identification parameter, from a product of the estimated value of an amount of drawn air of the cylinder, based on a value of intake manifold pressure and the value of the fist identification parameter, to obtain and deliver as an output, a final estimated value of an amount of drawn air of the cylinder.

In the present embodiment, a final estimated value of an amount of drawn air of the cylinder, is obtained by subtracting a product of the estimated value of an amount of recycled exhaust gas and a value of the second identification parameter, from a product of the estimated value of an amount of drawn air of the cylinder, based on a value of intake manifold pressure and a value of the first identification parameter. Accordingly, a change man actual amount of drawn air of the cylinder due to turning on and off of recycling of waste gas, can be reflected on the estimated value, without delay behind the turning on and off of recycling of waste gas. As a result, accuracy of air fuel ratio control can be increased when recycling of waste gas is turned on or off.

According to another embodiment of the present invention, when determining first and second identification parameters using an adaptive observer, a forgetting factor is used for the second identification parameter.

In the present embodiment, when an amount of air having passed through the throttle, remains invariant, the second parameter will become zero. Accordingly an increase (a drift) in a sum of the absolute values of the first and second parameters, can be prevented when an amount of air having passed through the throttle, remains invariant. As a result, a remarkable decrease in accuracy of a final estimated value of an amount of drawn air of the cylinder, can be prevented.

A method for estimating an amount of drawn air of a cylinder of an internal combustion engine, according to another embodiment of the present invention, comprises the step of obtaining an estimated value of an amount of drawn air of the cylinder, based on a value of intake manifold pressure. The method further comprises the step of obtaining a difference of values of intake manifold pressure, a second-order difference of values of intake manifold pressure, a difference of values of an amount of air having passed through a throttle and a difference of estimated values of an amount of drawn air of the cylinder, based on a value of intake manifold pressure. The method further comprises the step of determining a value of an identification parameter using an adaptive observer. The method further comprises the step of subtracting a product of the difference of values of intake manifold pressure and the value of the identification parameter, from a value of an amount of air having passed through the throttle, to obtain a final estimated value of an amount of drawn air of the cylinder. The adaptive observer determines a value of the identification parameter in such a way that a product of the second-order difference of values of intake manifold pressure and a value of the identification parameter, made equal to a value obtained by subtracting the difference of estimated values of an amount of drawn air of the cylinder, based on a value of intake manifold pressure, from the difference of values of an amount of air having passed through the throttle.

An apparatus for estimating an amount of drawn air of a cylinder of an internal combustion engine, according to the present embodiment, comprises a module for obtaining an estimated value of an amount of drawn air of the cylinder, based on a value of intake manifold pressure, to deliver the estimated value of an amount of drawn air, as an output. The apparatus further comprises at least one module for obtaining a difference of values of intake manifold pressure, a second-order difference of values of intake manifold pressure, a difference of values of an amount of air having passed through a throttle and a difference of estimated values of an amount of drawn air of the cylinder, based on a value of intake manifold pressure. The apparatus further comprises a module for determining a value of an identification parameter using an adaptive observer and a module for multiplying the difference of values of intake manifold pressure by the value of the identification parameter. The apparatus further comprises a module for subtracting a product of the difference of values of intake invalid pressure and the value of the identification parameter, from a value of an amount of air having passed through the throttle, to obtain and deliver, as an output, a final estimated value of an amount of drawn air of the cylinder. The adaptive observer determines a value of the identification parameter in such a way that a product of the second-order difference of values of intake manifold and a value of the identification parameter, is made equal to a value obtained by subtracting the difference of estimated values of an amount of drawn air of the cylinder, based on a value of intake invalid pressure, from the difference of values of an amount of air having passed through the throttle.

A computer-readable medium, according to the present embodiment, has a program stored therein. The program is made to perform the step of obtaining an estimated value of an amount of drawn air of the cylinder, based on a value of intake manifold pressure. The program is made to further perform the step of obtaining a difference of values of intake manifold pressure, a second-order difference of values of intake manifold pressure, a difference of values of an amount of air having passed through a throttle and a difference of estimated values of an amount of drawn air of the cylinder, based on a value of intake manifold pressure. The program is made to further perform the step of determining a value of an identification parameter using an adaptive observer. The program is made to further perform the step of subtracting a product of the difference of values of intake manifold pressure and the value of the identification parameter, from a value of an amount of air having passed through the throttle, to obtain a final estimated value of an amount of drawn air of the cylinder. The adaptive observer determines a value of the identification parameter in such a way that a product of the second-order difference of values of intake manifold pressure and a value of the identification parameter, made equal to a value obtained by subtracting the difference of estimated values of an amount of drawn air of the cylinder, based on a value of intake manifold pressured, from the difference of values of an amount of air having passed through the throttle.

An apparatus for estimating an amount of drawn air of a cylinder of an internal combustion engine, according to the present embodiment, comprises means for obtaining an estimated value of an amount of drawn air of the cylinder, based on a value of intake manifold pressure, to deliver the estimated value of an amount of drawn air, as an output. The apparatus further comprises at least means for obtaining a difference of values of intake in a manifold pressure, a second order difference of values of intake manifold pressure, a difference of values of an amount of air having passed through a throttle and a difference of estimated values of an amount of drawn air of the cylinder, based on a value of intake manifold pressure. The apparatus further comprises means for determining a value of an identification parameter using an adaptive observer and means for multiplying the difference of values of intake manifold pressure by the value of the identification parameter. The apparatus further comprises means for subtracting a product of the difference of values of intake manifold pressure and the value of the identification parameter, from a value of an amount of air having passed through the throttle, to obtain and deliver, as an output, a final estimated value of an amount of drawn air of the cylinder. The adaptive observer determines a value of the identification parameter in such a way that a product of the second-order difference of values of intake manifold pressure and a value of the identification parameter, is made equal to a value obtained by subtracting the difference of estimated values of an amount of drawn air of the cylinder, based on a value of intake manifold pressure, from the difference of values of an amount of air having passed through the throttle.

According to the present embodiment, a product of difference of values of intake manifold pressure and a value of the identification parameter, is subtracted from a value of an amount of air having passed through the throttle, to obtain a final estimated value of an amount of drawn air of the cylinder. A value of the identification parameter is determined by the adaptive observer, in such a way that a change in a final estimated value of an amount of drawn air of the cylinder, is made to coincide with a change in an estimated value of drawn air of the cylinder, based on intake mild pressure. Accordingly, a first estimated value of drawn air of the cylinder shows behavior similar to behavior of an estimated value of drawn air, based on intake manifold pressure, which is identical with behavior of an a al amount of drawn air of the cylinder in a transient state. As a result, accuracy of air-fuel ratio control can be increased in a transient state.

A method for controlling an amount of drawn air of a cylinder, according to still another embodiment of the present invention, first comprises the step of controlling the final estimated value of an amount of drawn air of the cylinder, obtained through a method for estimating an amount of drawn air of the cylinder, according to any one of embodiments of the present invention, to a desired value.

An apparatus for controlling an amount of drawn air of a cylinder, according to the present embodiment, comprises an apparatus for estimating an amount of drawn air of a cylinder according to any one of the embodiments of the present invention. The apparatus further comprises a controller receiving, as inputs, the final estimated value of the apparatus for estimating an amount of drawn air of a cylinder and a desired value of an amount of drawn air, to manipulate throttle opening in such a way that the final estimated value is controlled at the desired value.

According to the present embodiment, an estimated value of an amount of drawn air of the cylinder, obtained using the adaptive observer, according to any one of embodiments of the present invention, is controlled to a desired value. Accordingly, an amount of drawn air of the cylinder can be estimated with high accuracy, independently of a moving rate and a moving direction of the throttle. As a result, an amount of drawn air of the cylinder can be controlled with high accuracy, even when the throttle is required to move quickly. In other words, driving torque of the engine can be similarly controlled.

According to another embodiment, a response-specifying type control algorithm is used for the control.

Use of a response-specifying type control algorithm, allows control of an amount of drawn air of the cylinder, without generating an overshoot over a desire value. In other words, driving torque of the engine can be controlled, without generating an overshoot over a desired value of torque. As a result, drivability is enhanced as well as fuel efficiency is enhanced through reduction of wastes in HEV/GDI (a combination of a GDI engine and an electric motor) system.

DETAILED DESCRIPTION OF THE PREFERRED EMBODIMENTS

An embodiment of the present invention will be described below.

At first, a gas at intake manifold pressure Pb is assumed to be charged into the cylinder without considering a filling efficiency, and an estimated value Gair__Pb of an amount of drawn air of the cylinder, based on intake manifold pressure, is calculated using the following equation.

$$Pb(k)Vcyl=Gair\_Pb(k)R\ Tcyl \qquad (5)$$

Vcyl, R, Tcyl and k respectively represent a volume of the cylinder (a effective compressed volume of the cylinder in the case of flexible valve timing mechanism), the gas constant, gas temperature in the cylinder and control time synchronized with TDC. Gas temperature in the cylinder Tcyl is assumed to be equal to gas temperature in the intake manifold Tb. The above equation (5) is transformed into the following equation (6).

$$Gair\_Pb(k)=(Pb(k)Vcyl)/(R\ Tcyl) \qquad (6)$$

Figure 1:
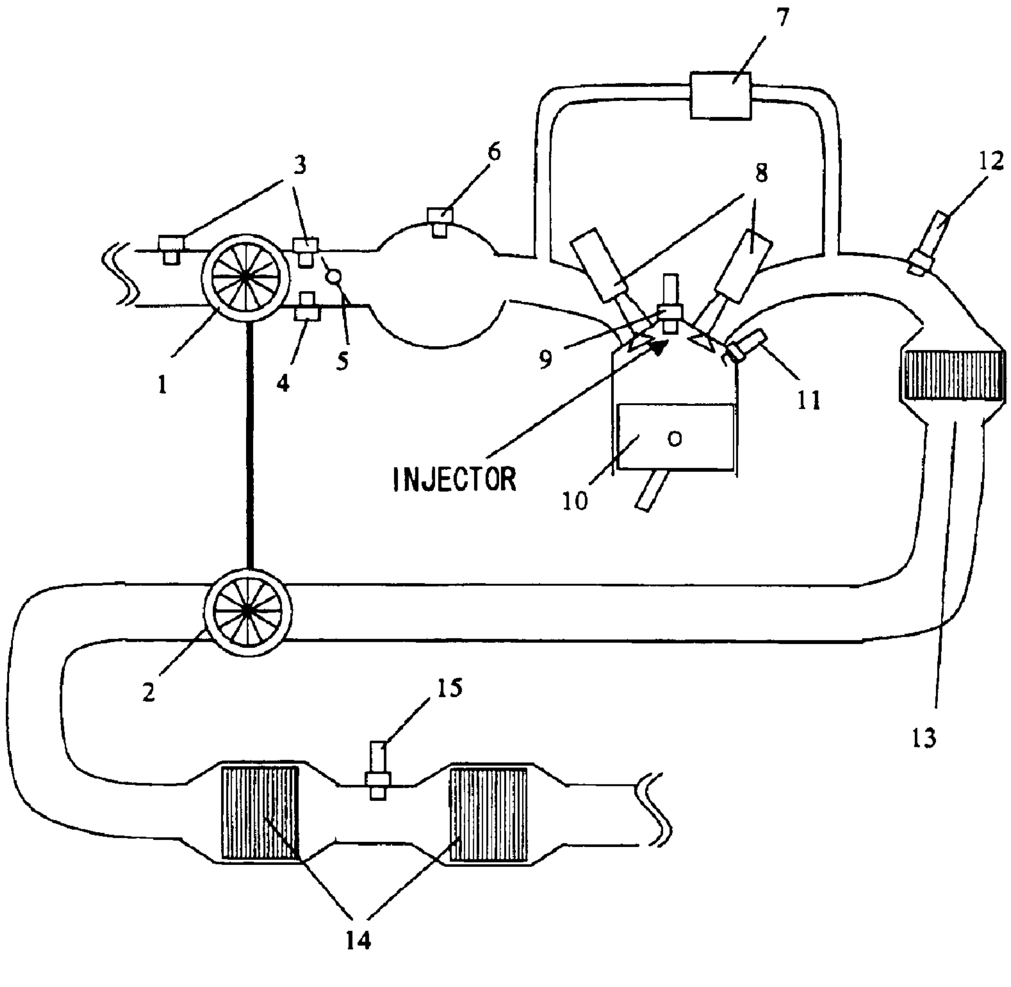
FIG. 1 shows as structure of an internal-combustion engine to which a method and an apparatus for estimating an amount of drawn air and an apparatus for controlling a value estimated by the above-mentioned method and apparatus for estimation, to a desired value, according to the present invention, are applied
Figure 2:
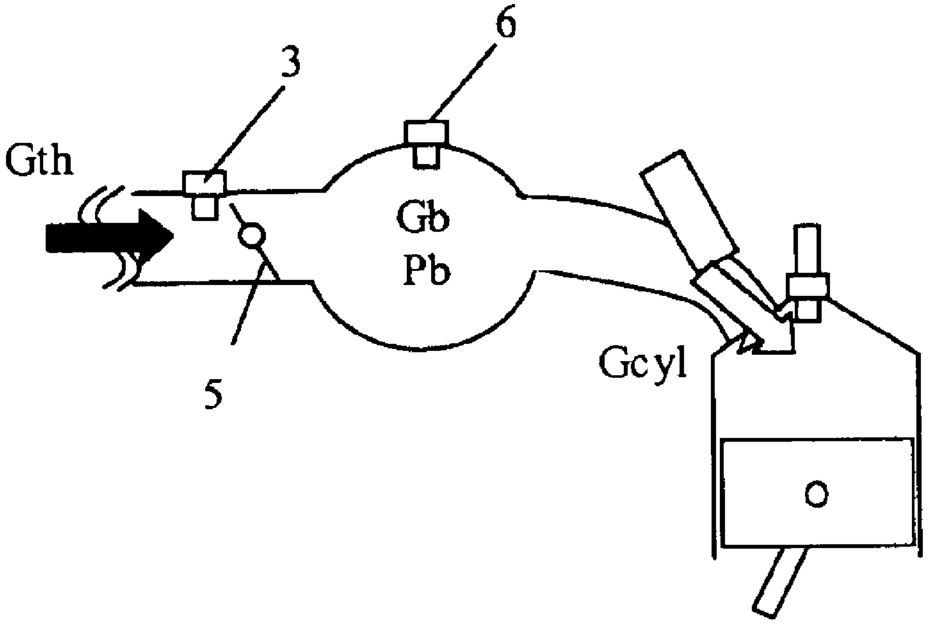
FIG. 2 shows an air-drawing section of the internal combustion engine.
Figure 3:
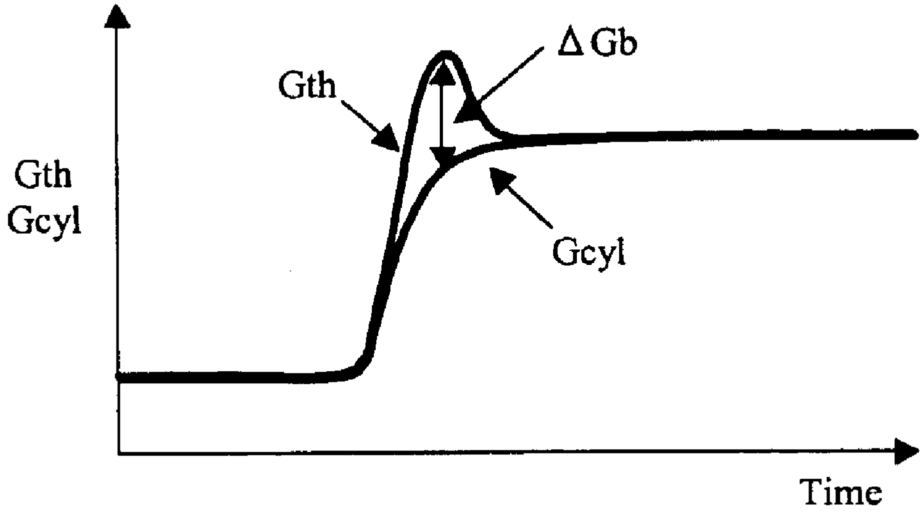
FIG. 3 shows a relationship between an amount of air having passed through the throttle Gth and an amount of drawn air of the cylinder Gcyl.
Figure 4:
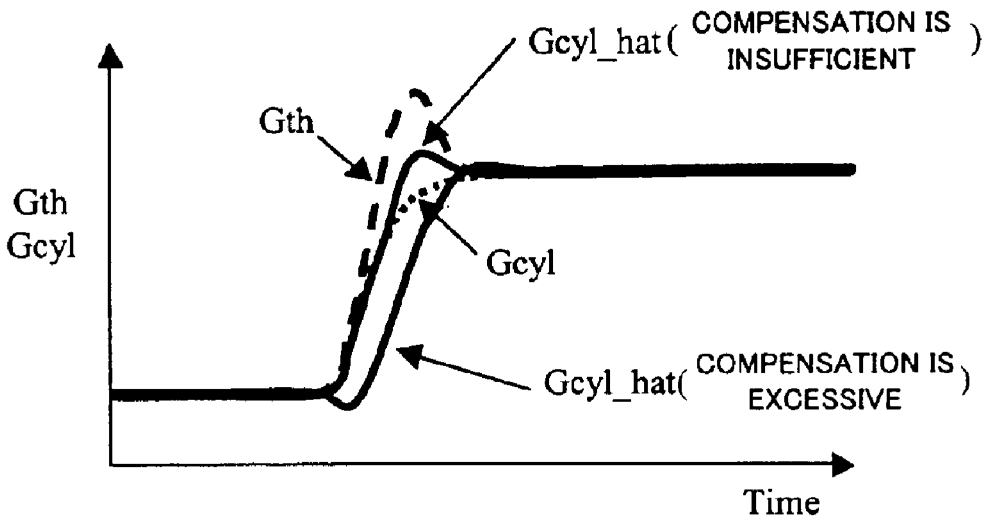
FIG. 4 shows behavior of an estimated value of an amount of drawn air of the cylinder when compensation for the overshot of an amount of air having passed through the throttle Gth, is excessive or insufficient in a conventional system.
Figure 5:
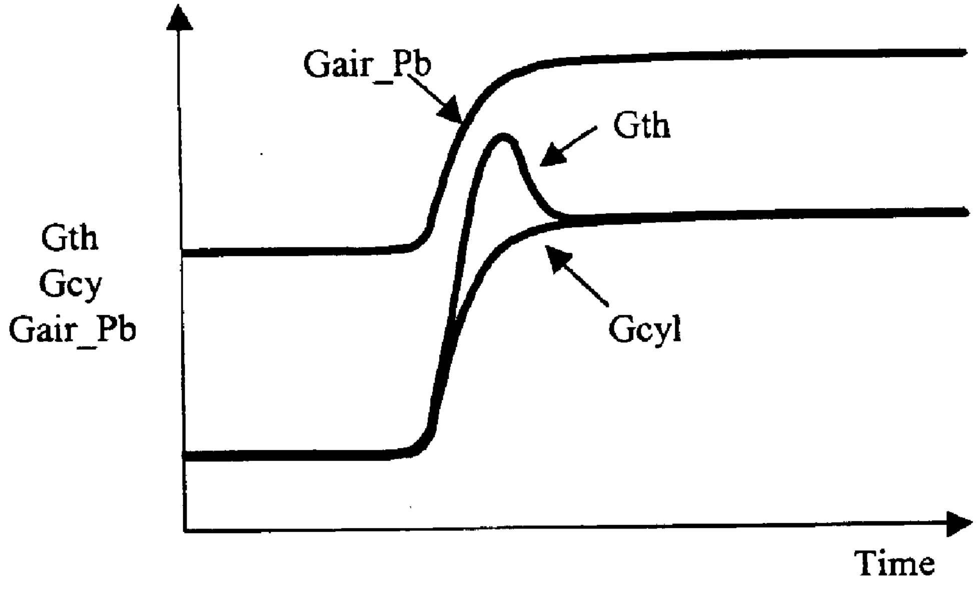
FIG. 5 shows a relationship among an amount of drawn air of the cylinder Gcyl, an amount of air having passed through the throttle Gth and an estimated value Gair__Pb of an amount of drawn air of the cylinder, based on an amount of drawn air of the cylinder.

In this ease, a relationship among an amount of drawn air of the cylinder Gcyl an amount of air having passed through the throttle Gth and an estimated value Gair__Pb of an amount of drawn air of the cylinder, obtained sing intake manifold pressure, is shown in FIG. 5. Since a filling efficiency is neglected, there is an offset between an estimated value Gair__Pb of an amount of drawn air of the cylinder and an amount of drawn air of the cylinder Gcyl. However, behavior of the estimated value corresponds to that of an amount of drawn air of the cylinder Gcyl. In the present embodiment, attention has been focused on this characteristic of an estimated value Gair__Pb of an amount of drawn air of the cylinder.

In other words, an estimated value Gair__Pb of an amount of drawn air of the cylinder has information on behavior of an amount of drawn air of the cylinder Gcyl while an amount of air having passed through the throttle Gth has information on a filing efficiency of the cylinder. Accordingly, a method has been invented, in which an amount of air having passed through the throttle Gth is used to compensate for an offset of an estimated value Gair__Pb of an amount of drawn air of the cylinder.

Since a fling efficiency of the cylinder is not constant, an offset between an estimated value Gair__Pb of an amount of drawn air of the cylinder and an amount of drawn air of the cylinder Gcyl is not constant in a sit sense. Accordingly, adjustment of an estimated value Gair__Pb of an amount of drawn air of the cylinder, thorough an amount of drawn air of the cylinder Gcyl, must be adaptive.

For this reason, in the present invention an adaptive observer is used to make adaptive adjustment. Particularly, in the present embodiment, a recursive identification algorithm is used as an adaptive observer, to adjust an estimated value Gair__Pb of an amount of drawn air of the cylinder, using identification parameter A to obtain a final estimated value Gcyl__hat of an amount of drawn air of the cylinder, as shown below.

$$Gcyl\_hat(k)=A'(k)Gair\_Pb(k) \qquad (7)$$

$$A'(k)=A'(k-1)+KP'(k)(ide'(k)-Klact\Delta LACT) \qquad (8)$$

$$KP(k)=\frac{P'(k-1)Z'(k)}{1+Z'(k)P'(k-1)Z'(k)} \tag{9}$$

$$ide'(k)=Gth(k)-A'(k-1)Gair\_Pb(k) \tag{10}$$

$$P'(k+1)=\frac{1}{\lambda_1}\left(1-\frac{\lambda_2P'(k)Z'(k)Z'(k)}{\lambda_1+\lambda_2Z'(k)P'(k)Z'(k)}\right)P'(k) \tag{11}$$

$$Z'(k)=Gair\_Pb(k) \tag{12}$$

$$\Delta LACT=LACT(k)\cdot LACT(k-1) \tag{13}$$

$\lambda_1$ and $\lambda_2$ represent weighting parameters. LACT and Klact respectively represent an amount of lift of the exhaust gas recycling (EGO valve and a damping factor. When $\lambda_1=1$ and $\lambda_2=1$, the method is least square. When $\lambda_1<1$ and $\lambda_2=1$, the method is weighted least square. When $\lambda_1=1$ and $\lambda_2=0$, the method is of fixed gain. When $\lambda_1=1$ and $\lambda_2<1$, the method is of gradually decreasing gain. Identification parameter A' is determined in such a way that an error in Equation (10) is Term ΔLACT of in Equation (8) is a term for damping to control oscillation of a final estimated value Gcyl_hat of an amount of drawn air of the cylinder, in the case of a sudden change in an amount of lift of the EGR valve. In the case of a sudden change in an amount of lift of the EGR valve, a filling efficiency of the cylinder will suddenly change to cause a spike error. This will have identification parameter A' oscillate. The above-mentioned term for damping is intended to prevent oscillation of the identification parameter.

Figure 6:
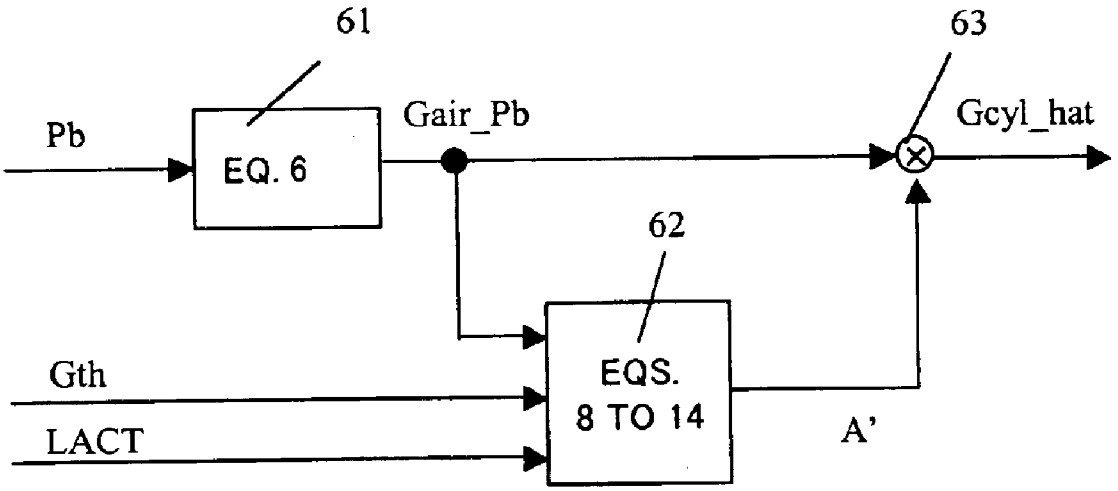
FIG. 6 shows a block diagram of an apparatus fir estimating an amount of drawn air of the cylinder, according to an embodiment of the present invention

FIG. 6 shows a block diagram of an apparatus for estimating an amount of drawn air of the cylinder, according to the present embodiment. The apparatus for estimating an amount of drawn air of the cylinder, comprises a module 61, a module 62 and a multiplying module 63. The module 61 receives a value of intake manifold pressure Pb as input, obtains an estimated value Gair_Pb of an amount of drawn air of the cylinder and delivers the estimated value as output [Equation (6)]. The module 62 receives an amount of air having passed through throttle Gth, the estimated value Gair_Pb of an amount of drawn air of the cylinder and an amount of lift of the exhaust gas recycling (EGR) valve LACT, as inputs, determines an identification parameter A', using recursive least square method and delivers the parameter as output [Equations (8) to (13)]. Identification parameter A' is determined in such a way that an error in Equation (10) is minimize. The multiplying module 63 multiplies the estimated value Gair_Pb of an amount of drawn air of the cylinder by the identification parameter A' to obtain a final estimated value Gcyl_hat of an amount of drawn air of the cylinder [Equation (7)].

Figure 7:
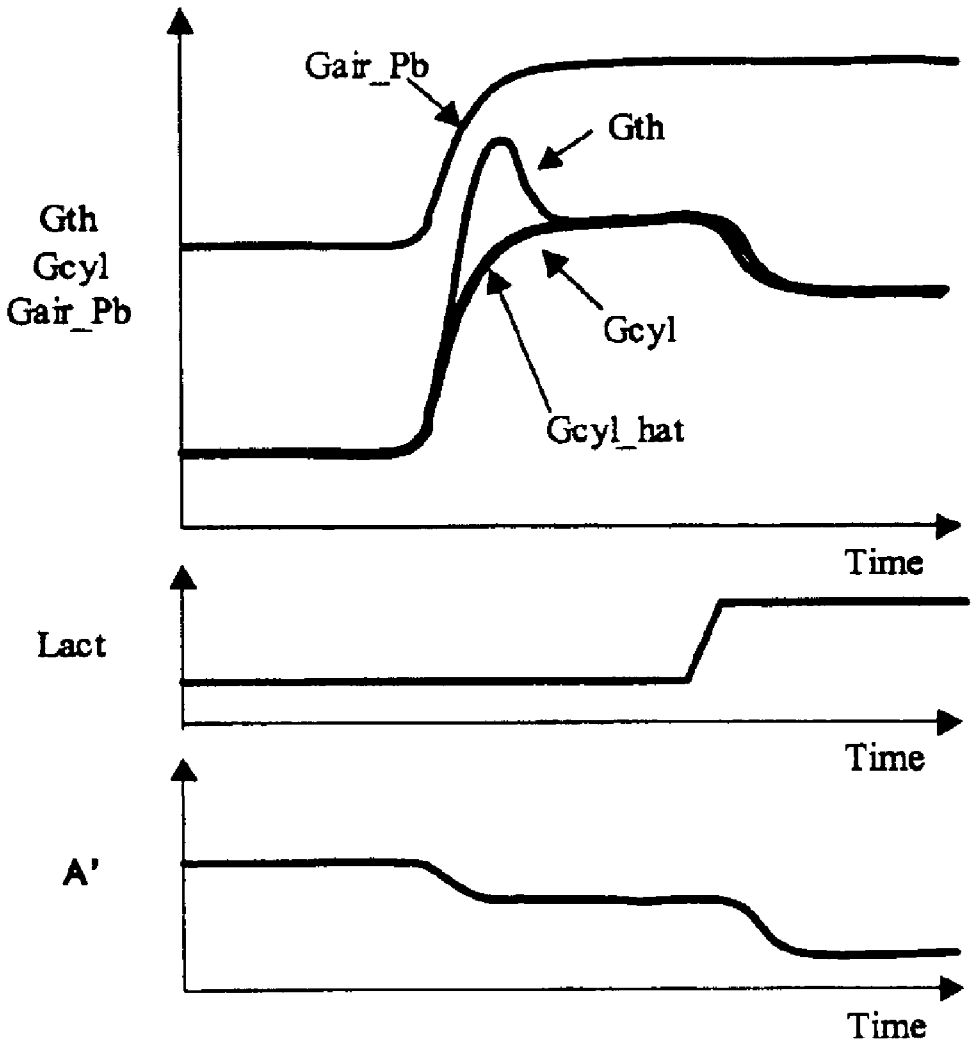
FIG. 7 shows an estimated result of an amount of drawn air of the cylinder, according to an embodiment of the present invention.

FIG. 7 shows an estimated result of an amount of drawn air of the cylinder, acceding to the present embodiment. Even when an amount of air having passed through the throttle Gth or an amount of lift of the EGR valve LACT, changes, a final estimated value Gcyl_hat of an amount of drawn air of the cylinder, follows a value of an amount of drawn air of the cylinder Gcyl. The identification parameter A' changes depending on a change in an amount of air having passed through the throttle Gth and a change in an amount of lift of the EGR valve LACT.

Another embodiment of the present invention will be described below.

In the present embodiment, an amount of exhaust gas Gegr recycled through EGR passage, is estimated using the following equation.

$$Gegr(k)=Kgegr\ LACT(k\cdot d)\sqrt{Pa-Pb} \tag{14}$$

Kgegr, LACT and Pa respectively represent a calculation factor for a recycled amount of exhaust gas, an amount of lift of the valve and atmospheric pressure. Atmospheric pressure is substantially equal to pressure (back press) of exhaust gas.

A final estimated value Gcyl_hat of an amount of drawn air of the cylinder, is calculated using the following equation.

$$Gcyl_{13}\ hat(k)=A''(k)Gair\_Pb(k)-B''(k)Gegr(k) \tag{15}$$

A" and B" represent identification parameters. An estimated value Gair_Pb of an amount of drawn air of the cylinder will not reflect an effect of a recycled amount of exhaust gas (EGR). However, Equation (15) will eliminate an excessive portion of an estimated value Gair_Pb of an amount of drawn air of the cylinder, caused by an increase in pressure Pb due to the recycled amount of exhaust gas (EGR).

A procedure by which Equation (15) is calculated using recursive least square method, is shown with be following equations.

$$Gcyl\_hat(k)=A''(k)Gair\_Pb(k)-B''(k)Gegr(k) \tag{16}$$

$$\theta''(k)=\delta\theta''(k-1)+KP''(k)ide''(k) \tag{17}$$

$$KP''(k)=\frac{P''(k-1)Z''(k)}{1+Z''(k)^TP''(k-1)Z''(k)} \tag{18}$$

$$ide''(k)=Gth(k)-\theta''(k-1)^TZ''(k) \tag{19}$$

$$Z''(k)^T=[Gair\_Pb(k)Gegr(k)] \tag{20}$$

$$\theta''(k)^T=[A''(k),\cdot B''(k)] \tag{21}$$

$$\delta=\begin{bmatrix}1 & 0\\ 0 & \delta\end{bmatrix}:\ \text{Forgetting Vector}\,(0<\delta<1) \tag{22}$$

θ"(A", B") represents identification parameters, while P" represents an identification gain.

Since in Equations (17) to (22), there exist more than one identification parameters, a drift might occur when an amount of air having passed through the throttle Gth remains substantially constant. Accordingly, a fixed gain algorithm using σ—correction method, is employed as algorithm for identification.

Figure 8:
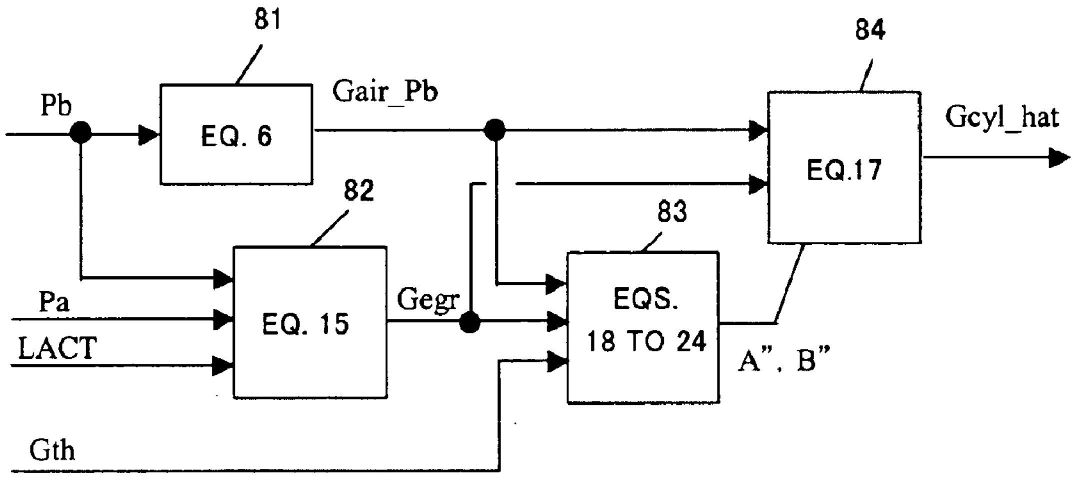
FIG. 8 shows a block diagram of an apparatus for estimating an amount of drawn air of the cylinder, according to another embodiment of the present invention

FIG. 8 shows a block diagram of an apparatus for estimating an amount of drawn air of the cylinder, according to the present embodiment. The apparatus for estimating an amount of drawn air of the cylinder, comprises a module 81, a module 82, a module 83 and a module 84. The module 81 receives a value of intake manifold pressure Pb as input, obtains an estimated value Gair_Pb of an amount of drawn air of the cylinder and delivers the estimated value as output [Equation (6)]. The module 82 receives a value of intake manifold pressure Pb, a value of atmospheric pressure Pa and a value of an amount of lit of the exhaust gas recycling valve LACT, as inputs, obtains an estimated value Gerg of an amount of recycled exhaust gas based on intake manifold pressure and delivers the estimated value as output [Equation (14)]. The module 83 receives an amount of air having passed through the throttle Gth, the estimated value Gerg of an amount of recycled exhaust gas, based on intake manifold pressure and the estimated value Gair_Pb of an amount of drawn air of the cylinder, based on intake manifold pressure, as inputs, obtains the first identification parameter A" and the second identification parameter B", using recursive least square mean method and delivers the identification parameters as outputs [Equations (17) to (2)]. The first and second identification parameters A" and B" are determined in such a way that an error in Equation (19) is minimized. The module 84 obtains a first product of the estimated value Gair_Pb of an amount of drawn air of the cylinder, based on intake manifold pressure and the first identification parameter A". The module 84 obtains a second product of the estimated value Gerg of an amount of recycled exhaust gas, based on intake manifold pressure and the second identification parameter B". Then, the module 84 subtracts the second product from the first product to obtain a final estimated value Gcyl_hat of an amount of drawn air of the cylinder [Equation (16)].

Figure 9:
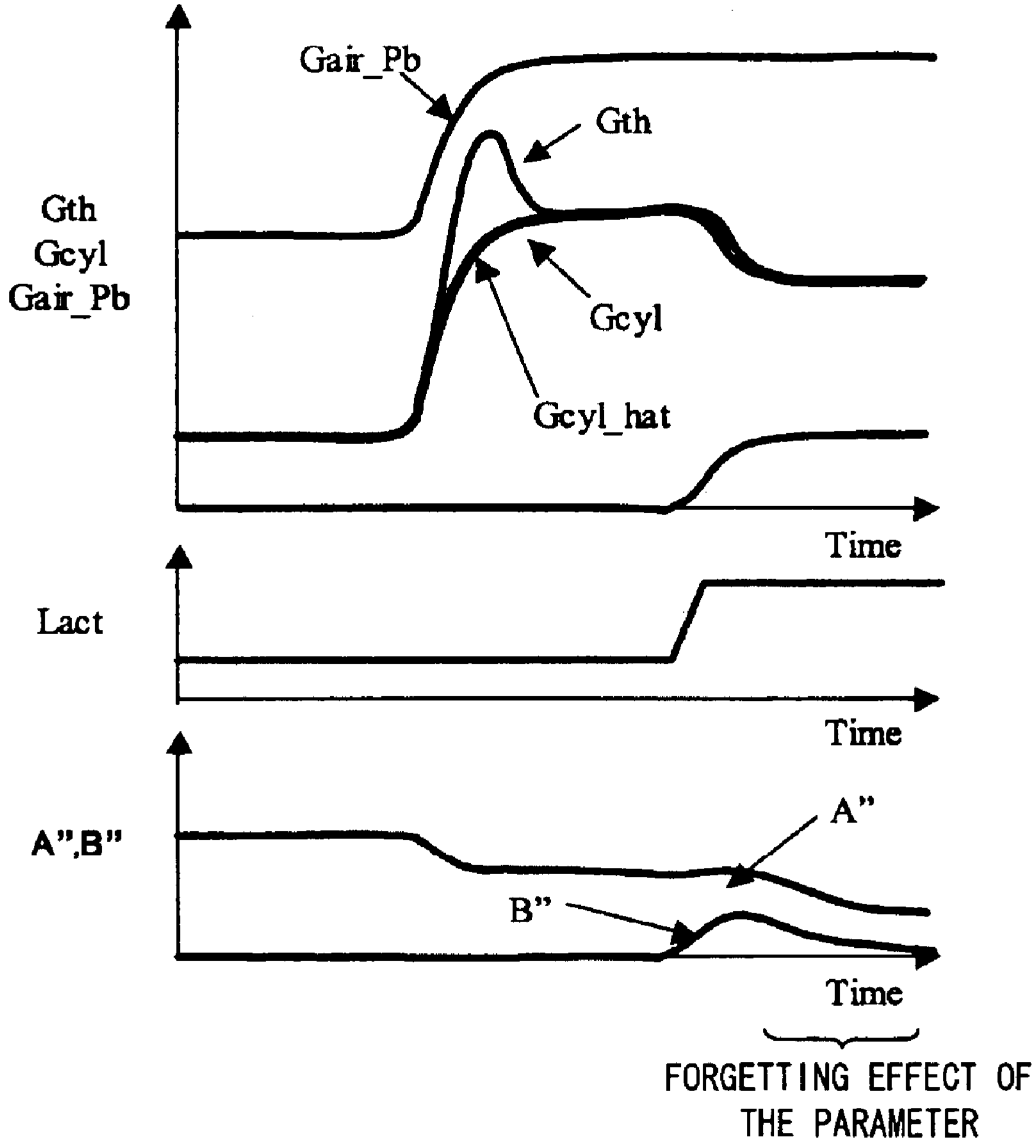
FIG. 9 shows an estimated result of an amount of drawn air of the cylinder, according to another embodiment of the present invention.

FIG. 9 shows an estimated result of an amount of drawn air of the cylinder, according to the present embodiment. Even when an amount of air having passed through the throttle Gth or an amount of lift LACT of the EGR valve, changes, a final estimated value Gcyl_hat of an amount of drawn air of the cylinder, flows a value of an amount of drawn air of the cylinder Gcyl. The first identification parameter A" changes depending on a change in an amount of air having passed through the throttle Gth and a change in an amount of lift LACT of the EGR valve. The second identification parameter B" diaries depending on a change in an amount of lift LACT of the EGR valve and returns back to zero in a steady state. Such behaviors of the identification parameters allow estimation with high-accuracy even at a sudden change in an amount of lift of the EGR valve.

Still another embodiment of the present invention will be described below.

An estimated value Gair_Pb of an amount of drawn air of the cylinder, based on intake manifold pressure, has precise information on a change in an amount of drawn air of the cylinder. Accordingly, a change ΔGb in an amount of gas filling the intake manifold is adaptively calculated in such a way that a change in a final estimated value Gcyl_hat of an amount of drawn air of the cylinder, is made to coincide with a change in an estimated value Gair_Pb of an amount of drawn air of the cylinder, based on intake manifold pressure.

Conventionally, an estimated value Gcyl_hat of an amount of drawn air of the cylinder, is calculated using the following equation.

$$Gcyl\_hat(k)=Gth(k)-\Delta Gb(k) \quad (4)$$

$$\Delta Gb(k)=\Delta Pb(k)Vb/(R\ Tb) \quad (3)$$

The conventional method mentioned above has the problem that a change ΔGb in an amount of gas filling the intake manifold, cannot be properly set for variation between engines or sensor properties and secular variation.

Therefore, an estimated value Gcyl_hat of an amount of drawn air of the cylinder, is newly defined by the following equation.

$$Gcyl\_hat(k)=Gth(k)\cdot A\Delta\Delta Pb(k) \quad (23)$$

It should be noted that identification parameter A is used to adaptively calculate a change ΔGb in an amount of gas filing the intake manifold.

A difference of Equation (23) is obtained as below.

$$\Delta Gcyl\_hat(k)=\Delta Gth(k)-A\Delta\Delta Pb(k) \quad (24)$$

$$\Delta Gcyl\_hat(k)=Gcyl\_hat(k)-Gcyl\_hat(k-1) \quad (25)$$

$$\Delta Gth(k)=Gth(k)-Gth(k-1) \quad (26)$$

$$\Delta\Delta Pb(k)=\Delta Pb(k)-\Delta Pb(k-1) \quad (27)$$

A difference of an estimated value Gair_Pb of an amount of drawn air of the cylinder, based on intake manifold pressure, is defined by the following equation.

$$\Delta Gair\_Pb(k)=Gair\_Pb(k)-Gair\_Pb(k-1) \quad (28)$$

The condition that a change in a final estimated value Gcyl_hat of an amount of drawn air of the cylinder, coincides with a change in an estimated value Gair_Pb of an amount of drawn air of the cylinder, based on intake manifold pressure, is represented by the following equation.

$$\Delta Gair\_Pb(k)=\Delta Gcyl\_hat(k) \quad (29)$$

Substituting Equation (24) to the right side of Equation (29) leads to the following equation.

$$\Delta Gth(k)-\Delta Gair\_Pb(k)=A\Delta\Delta Pb(k) \quad (30)$$

Thus, identification parameter A should be defined in such a way that Equation (30) is satisfied, to calculate a final estimated value Gcyl_hat of an amount of drawn air of the cylinder. A method by which the final estimated value is calculated, is shown specifically by the following equations.

$$Gcyl\_hat(k)=Gth(k)-A\Delta Pb(k) \quad (31)$$

$$A(k)=A(k-1)+KP(k)ide(k) \quad (32)$$

$$KP(k)=\frac{P'(k-1)Z(k)}{1+Z(k)P(k-1)Z(k)} \quad (33)$$

$$ide(k)=\Delta Gth(k)-\Delta Gair\_Pb(k)-A\Delta\Delta Pb(k)=\Delta Gth(k)-\Delta Gair\_Pb(k)-AZ(k) \quad (34)$$

$$P(k+1)=\frac{1}{\lambda_1}\left(1-\frac{\lambda_2 P(k)Z(k)Z(k)}{\lambda_1+\lambda_2 Z(k)P(k)Z(k)}\right)P(k) \quad (35)$$

$$Z(k)=\Delta\Delta Pb(k) \quad (36)$$

$\lambda_1$ and $\lambda_2$ represent weighting parameters.

Figure 10:
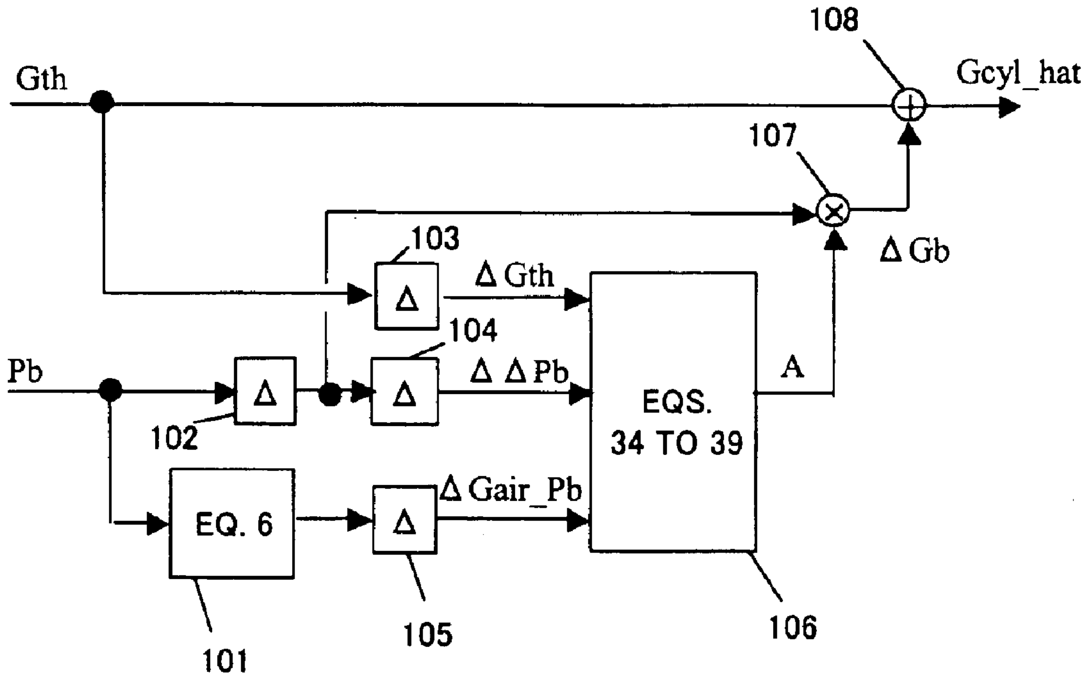
FIG. 10 shows a block diagram of an apparatus for estimating an amount of drawn air of the cylinder, according to another embodiment of the present invention

FIG. 10 shows a block diagram of an apparatus for estimating an amount of drawn air of the cylinder, according to the present embodiment. The apparatus for estimating an amount of drawn air of the cylinder, comprises modules 101 to 108. The module 101 receives a value of intake manifold pressure Pb as input, obtains an estimated value Gair_Pb of an amount of drawn air of the cylinder, based on intake manifold pressure and delivers the estimated value as output [Equation (6)]. The modules 102 to 105 are devices for obtaining differences. The module 106 receives a difference ΔGth of an amount of air having passed through the throttle, a second order difference ΔΔPb of intake manifold pressure and a difference ΔGair_Pb of an estimated value Gair_Pb of an amount of drawn air of the cylinder, based on intake manifold pressure, as inputs. Then, the module 106 determines identification parameter A in such a way that a change in a final estimated value Gcyl_hat of an amount of drawn air of the cylinder, is made to coincide with a change in an estimated value Gair_Pb of an amount of drawn air of the cylinder [Equations 32 to 36]. More specifically, the identification parameter A is determined in such a way that an error in Equation (34) is minimized. The module 107 multiplies the estimated value Gair_Pb by identification parameter A. The module 108 subtracts the result of the multiplication from an amount of air having passed through the throttle Gth, to obtain a final estimated value Gcyl_hat [Equation (31)].

Figure 11:
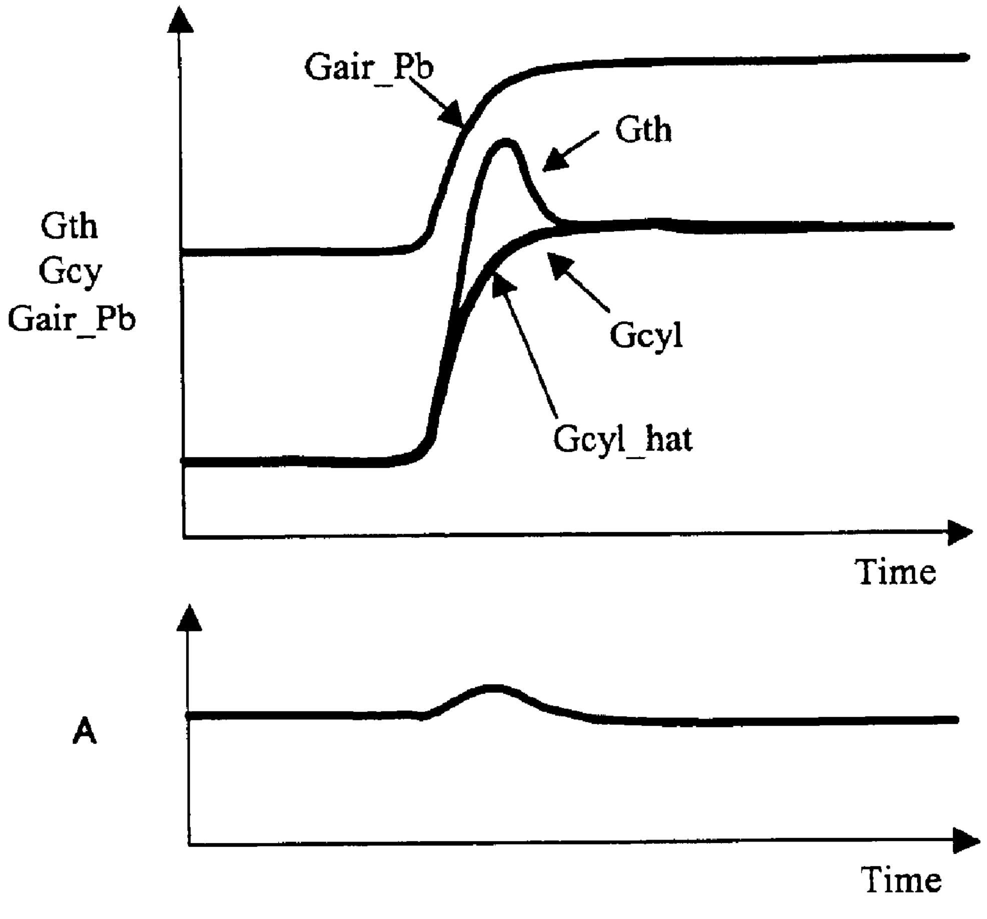
FIG. 11 shows an estimated result of an amount of drawn air of the cylinder, according to another embodiment of the present invention

FIG. 11 shows an estimated result of an amount of drawn air of the cylinder, according to the present embodiment. Even when an amount of air having passed through the throttle Gth changes, a final estimated value Gcyl_hat of an amount of drawn air of the cylinder, follows a value of an amount of drawn air of the cylinder Gcyl. The identification parameter A changes depending on a change in an amount of air having passed through the throttle Gth.

In the embodiments shown in FIGS. 6 and 8, behavior of a final estimated value Gcyl_hat of an amount of drawn air of the cylinder, in a transient state, is followed by recursive least square method having delay in response. Accordingly, when a convergence speed for an offset in a steady state between an amount of drawn air of the cylinder Gcyl and a final estimated value Gcyl_hat, is increased, behavior of a final estimated value Gcyl_hat, approaches that of a value of an amount of air having passed through the throttle Gth. On the other hand, in the embodiments shown in FIGS. 6 and 8, air-fuel ratio control in a steady state is considerably stable, because oscillations of an amount of air having passed through the throttle Gth, in a steady state is subjected to filtering.

In the embodiment shown in FIG. 10, a convergence speed for an offset in a steady state, can be increased, while oscillations of an amount of air having passed through the throttle Gth, in a steady state cannot be subjected to filtering.

A method by which an estimated value Gcyl_hat of an amount of drawn air of the cylinder, is controlled to a desired value Gcyl_cmd, will be described below. The value Gcyl_hat has been estimated by one of the apparatuses for estimating an amount of drawn air of the cylinder, according to the present invention, mentioned above.

A relationship between opening TH and a desired value TH_com of an electronically controlled throttle, can be approximated by the following equation.

$$TH(k)=Ath\ TH(k-1)+Bth\ TH\_cmd(k) \tag{37}$$

Ath and Bth are constants a sum of which is 1.

Further, an amount of air having passed through the throttle can be approximated by the following equation.

$$Gth'(k)=Sth(Pa,Pb,TH)TH(k) \tag{38}$$

Sth is a factor determined depending on atmospheric pressure Pa (substantially equal to a pressure at a point upstream the throttle), intake manifold pressure Pb and throttle opening TH.

The following equation is obtained from Equations (37) and (38).

$$\begin{aligned} Gth'(k) &= Sth(Pa, Pb, TH)TH(k) \\ &= Sth(Pa, Pb, TH)Ath\,TH(k-1) + \\ &\quad Sth(Pa, Pb, TH)Bth\,\mathrm{TH\_cmd}(k) \\ &= Ath\,Gth'(k-1) + Bth'\mathrm{TH\_cmd}(k) \end{aligned} \tag{39}$$

$$Bth'=Sth(Pa, Pb, TH)Bth$$

Further, since an amount of air having passed through the throttle Gth is substantially equal to an approximated value Gth', a relationship between Gth' and Gcyl_hat can be approximated by the following equation.

$$\begin{aligned} \mathrm{Gcyl\_hat}(k) &= Gth'(k) - \Delta Gb(k) \\ &= Gth'(k) - A(Pb(k) - Pb(k-1)) \end{aligned} \tag{40}$$

The following equations can be obtained by substituting Equation (39) into Equation (40).

$$\begin{aligned} \mathrm{Gcyl\_hat}(k) &= Gth'(k) - A\ Pb(k) + A\,Pb(k-1) \\ &= Ath\ Gth'(k-1) + Bth'\mathrm{TH\_cmd}(k) - \\ &\quad A\ Pb(k) + A\ Pb(k-1) \end{aligned} \tag{41}$$

$$Gcyl\_hat(k)=Ath\ Gth'(k-1)-A\ Pb(k)+APb(k-1)+Bth'TH\_cmd(k) \tag{42}$$

In the following equation, Gth' in Equation (42) is replaced with a measured value Gth from the air-low meter.

$$Gcyl\_hat(k)=Ath\ Gth(k-1)-APb(k)+APb(k-1)+Bth'TH\_cmd(k) \tag{43}$$

Equation (43) described above, is assumed to be a model which represents a relationship between a desired value TH_com of throttle opening and an estimated value Gcyl_hat of an amount of drawn air.

An error between an estimated value Gcyl_hat of an amount of drawn air and a desired value Gcyl_cmd of an amount of drawn air, is defined by the following equation.

$$Ge(k)=Gcyl\_hat(k)-Gcyl\_cmd(k) \tag{44}$$

Further, convergence behavior of Ge is defined by the following switch function σ.

$$\sigma(k)=Ge(k)-S\ Ge(k-1) \tag{45}$$

where $-1<S<1$. The switch function is represented as below.

$$Ge(k)=S\ Ge(k-1) \tag{46}$$

Figure 12:
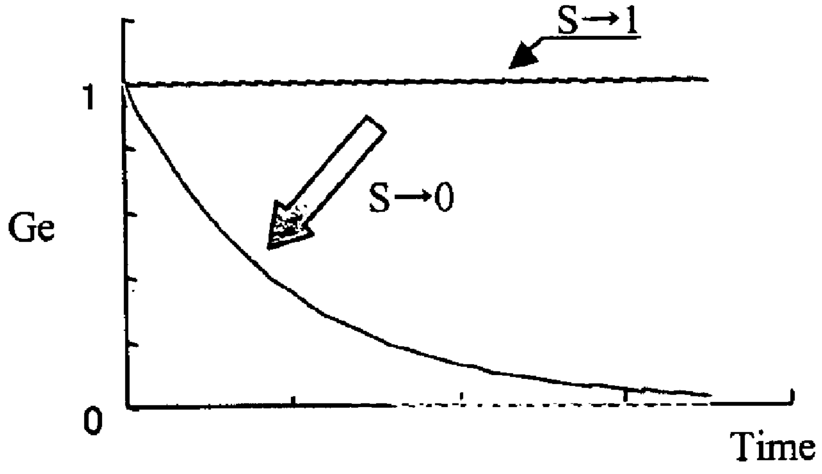
FIG. 12 shows behavior of error Ge converging to zero.

The switch function means that error Ge will converge to zero with behavior of a first-order delay system without an input, as shown in FIG. 12.

A response-specifying type controller which will realize convergence behavior specified by the switch function σ, is represented as below.

$$\begin{aligned} \mathrm{TH\_cmd'}(k) = &-Keq0\ \mathrm{Gcyl\_hat}(k) - Keq1\ Gth(k-1) - \\ &Keq2\ Pb(k) - \\ &Keq3\ Pb(k-1) - Krch\sigma(k) - Kadp\sum_{i=0}^{k}\sigma(i) \end{aligned} \tag{47}$$

Feedback gains Keq0, Keq1, Keq2, Keq3, Krch and kadp are determined to minimize the estimation function described below.

$$J = \sum_{j=0}^{k} \Delta X(j)\ Q\Delta X(j) + \Delta\mathrm{TH\_cmd'}(j)\ R\Delta\mathrm{TH\_cmd'}(j) \tag{48}$$

$$\Delta X(k)=[\Delta Gcyl\_hat(k)\Delta Gth(k)\Delta Pb(k)\Delta Pb(k-1)\Delta\sigma(k)\sigma(k)]^T \tag{49}$$

$$Q = \begin{bmatrix} q1 & 0 & 0 & 0 & 0 & 0 \\ 0 & q2 & 0 & 0 & 0 & 0 \\ 0 & 0 & q3 & 0 & 0 & 0 \\ 0 & 0 & 0 & q4 & 0 & 0 \\ 0 & 0 & 0 & 0 & q5 & 0 \\ 0 & 0 & 0 & 0 & 0 & q6 \end{bmatrix} \quad (50)$$

$$R=r0 \quad (51)$$

Q represents a set of weighting parameters, while q1, q2, q3, q4, q5, q6 and r0 are positive constants. If weighting factors are set as shown below, a convergence to zero of Δσ and σ can be made faster than a convergence to zero of each of state variables ΔGcyl_hat(k), ΔGth(k), ΔPb(k) and ΔPb (k−1). In other words, responses of specified errors can be made faster. Further, robust stability for modeling error and disturbances in the control system, can be improved $$q1,q2,q3,q4 \leq q5,q6 \quad (52)$$

Further, feedforward opening TH_ff is added to TH_cmd'in Equation (47) to obtain a desired value of throttle opening, that is, a controlled variable TH_cmd of throttle opening in the response-specifying type controller. Feedforward opening TH_ff is obtained based on accelerator pedal opening AP, vehicle velocity VP, transmission shift position NGEAR, charging pressure Pc, presence or absence of electric load and state of being turned on or off of the hydraulic pump for power steering.

$$\begin{aligned} TH\_cmd(k) &= TH\_ff(k) + TH\_cmd'(k) \\ &= TH\_ff(k) - Keq0\ Gcyl\_hat(k) - \\ &\quad Keq1\ Gth(k-1) - Keq2\ Pb(k) - \\ &\quad Keq3\ Pb(k-1) - Krch\sigma(k) - Kadp\sum_{i=0}^{k} \sigma(i) \end{aligned} \quad (53)$$

Figure 13:
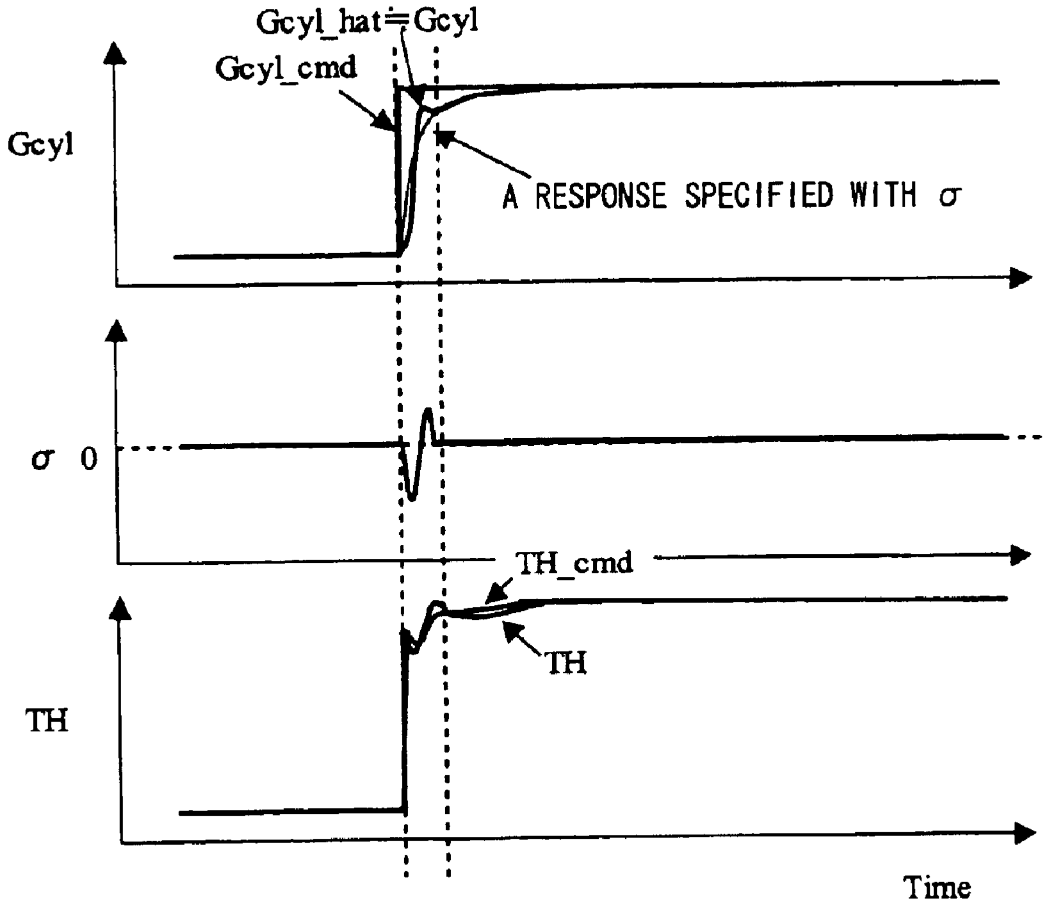
FIG. 13 shows a result of an amount of drawn air of the cylinder Gcyl controlled by the response-specifying type controller.

FIG. 13 shows a result of an amount of drawn air of the cylinder Gcyl controlled by the response-specifying type controller.

Figure 14:
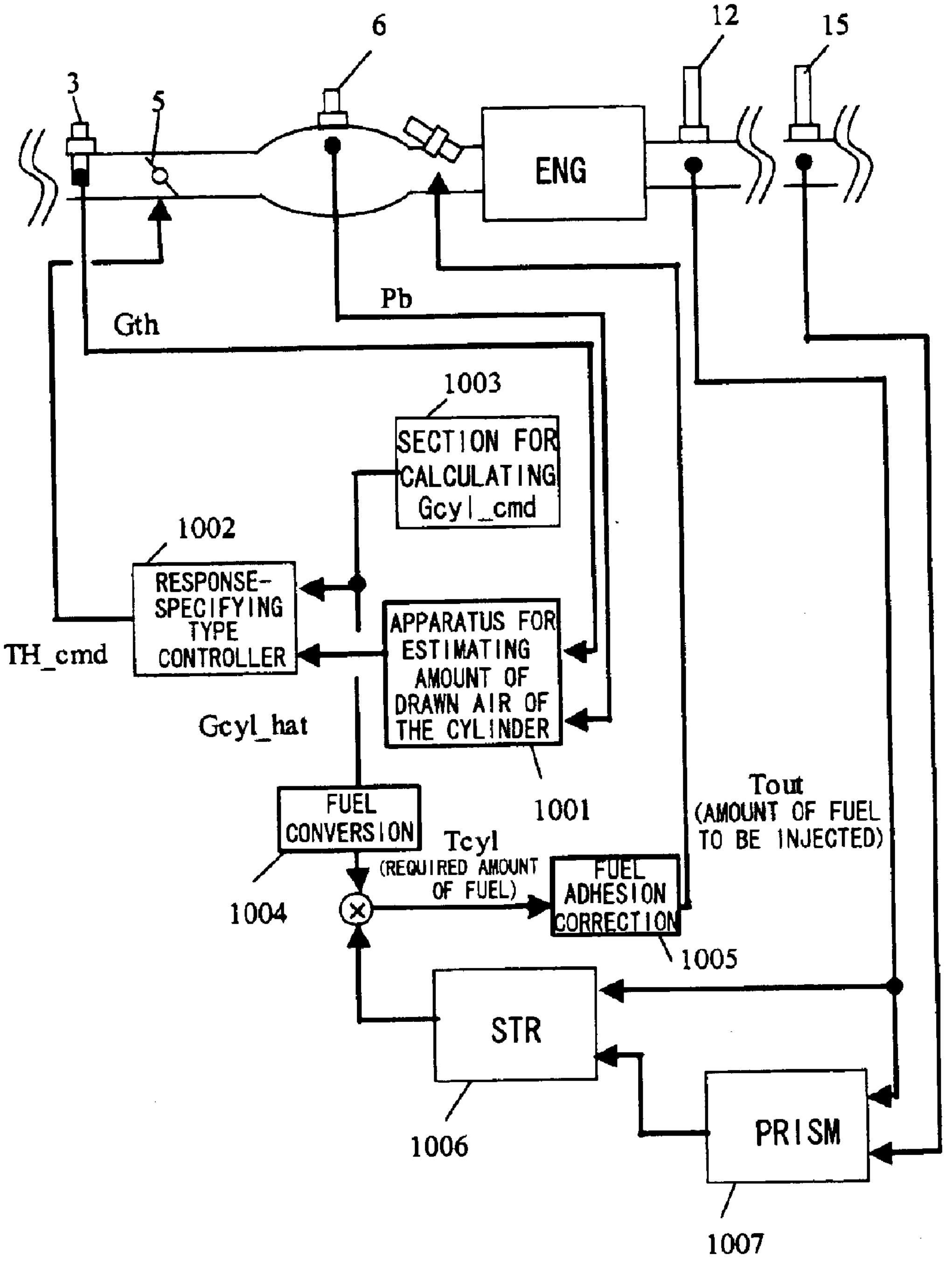
FIG. 14 shows a configuration of a fuel-injection control system comprising an apparatus for estimating an amount of drawn air and a response-specifying type controller for controlling an amount of drawn air, according to an embodiment of the present invention

FIG. 14 shows a configuration of a fuel-injection control system comprising the apparatus for estimating an amount of drawn air and the response-specifying type controller for controlling an amount of drawn air, according to the embodiment of the present invention The response-specifying type controller 1002 receives, as inputs, an estimated value of an amount of drawn air of the cylinder, from the apparatus 1001 for estimating an amount of drawn air of the cylinder and a desired value of an amount of drawn air of the cylinder, from a section 1003 for calculating a desired value of an amount of drawn air of the cylinder. The response-speeding type controller 1002 manipulates throttle opening to have an estimated value controlled at a desired value. In FIG. 14, a fuel conversion module and a fuel adhesion correction module are represented with reference numerals 1004 and 1005, while fuel correction factor calculating modules are represented with reference numerals 1006 and 1007. These modules determine an amount of fuel to be inject In FIG. 14 throttle opening is manipulated to control an amount of drawn air of the cylinder. Alternatively, an amount of drawn air of the cylinder can be controlled by flexible valve timing mechanism Further, in a system with a motor-driven compressor, an amount of drawn air of the cylinder can be controlled by adjusting voltage to be applied to the motor-driven compressor. In a system provided with a turbine with a waste gate, an amount of drawn air of the cylinder can be controlled by controlling the waste gate to control a pressure.

Figure 15:
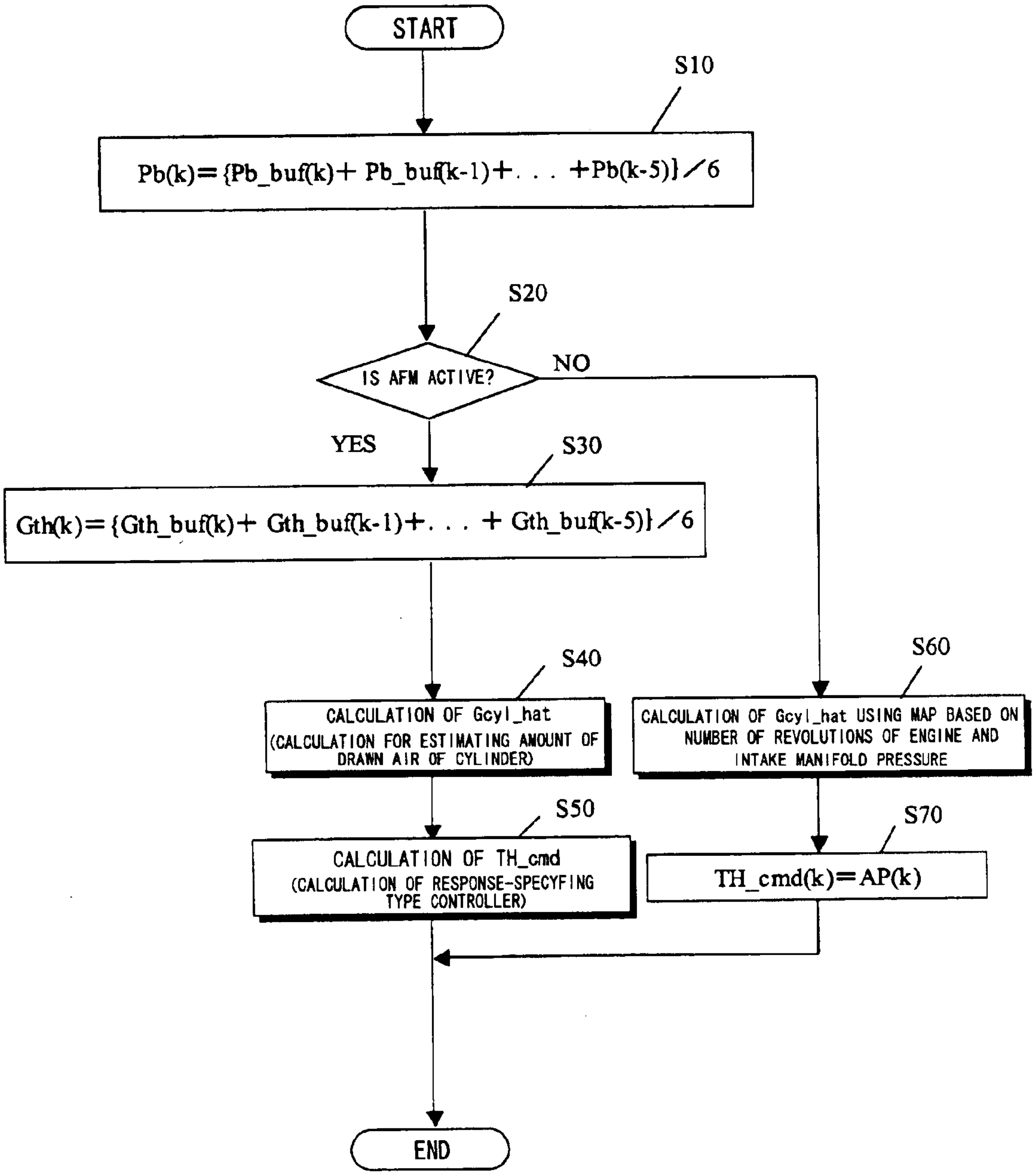
FIG. 15 shows a procedure of a method for estimating an amount of drawn air, according to an embodiment of the present invention.

FIG. 15 shows a procedure of a method for estimating an amount of drawn air, according to an embodiment of the present invention. Calculations of the procedure are carried out for each intake stroke (TDC). In step S10, values Pb_buf of intake manifold pressure sampled at certain crank angles (CRK) determined by dividing TDC into 6 equal parts, are subjected to 6-tap moving averaging to remove pulsing components of Pb_buf. For example, a crank angle for an intake stroke (TDC) is 180 degrees, and a crank angle (CRK) signal is delivered for every 30 degrees of crank rotation angle. In step S20, it is determined whether or not the airflow meter is active. If active, the process goes to step 30, in which values Gth_buf of an amount of air having passed through the throttle, are subjected to 6-tap moving averaging to remove pulsing components of Gth_buf. In step S40, an estimated value Gcyl_hat of an amount of drawn air of the cylinder, is calculated. In step S50, a desired value TH_cmd of throttle opening is calculated. If the airflow meter is determined to be not active in step S20, the process goes to step S60, in which an estimated value Gcyl_hat of an amount of drawn air of the cylinder, is calculated based on the number of revolutions of the engine and intake manifold pressure. In step S70, a desired value TH_cmd of throttle opening is made equal to accelerator pedal opening. At this time, when the accelerator pedal is fully dosed, a certain opening is given to allow the engine to maintain an idling speed. In other words, when the accelerator pedal is fully dosed, TH_cmd is determined by idling speed control not shown.

Figure 16:
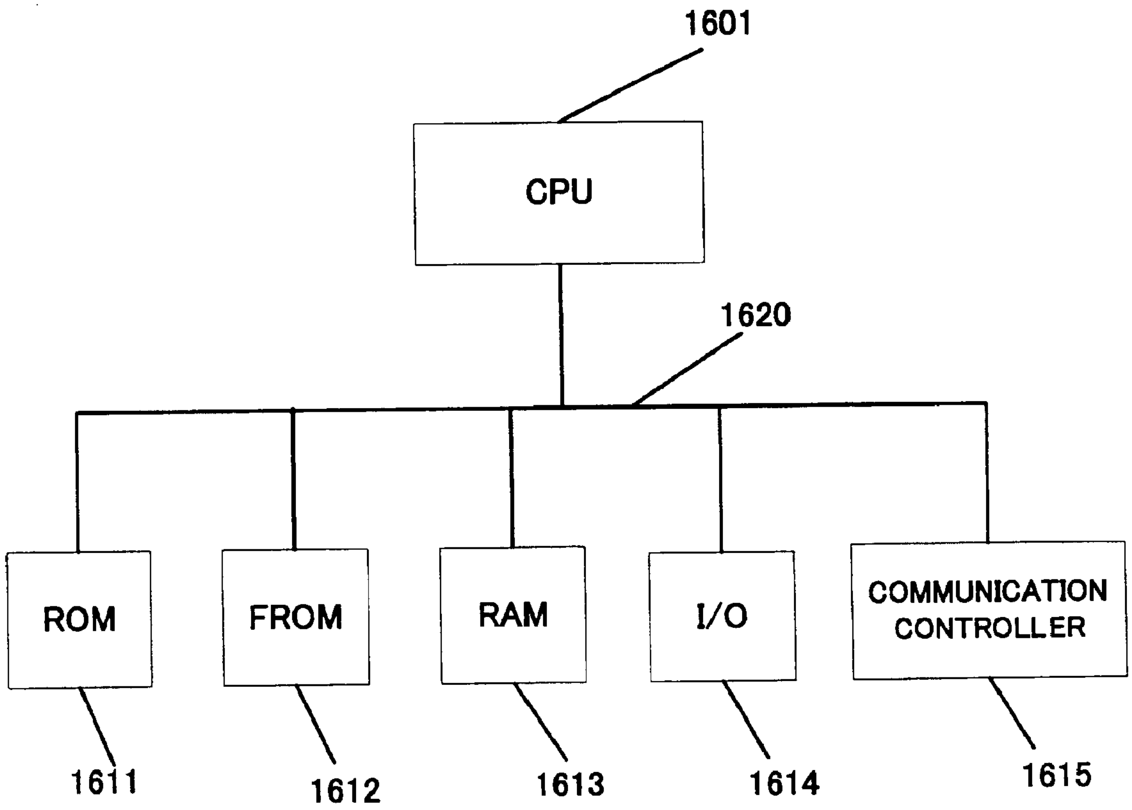
FIG. 16 shows an example of an electronic control unit used in embodiments of the present invention.

An example of an electronic control unit used in embodiments of the present invention, will be described with reference to FIG. 16. The electronic control unit includes a CPU 1601, a ROM 1611, a flash memory 1612, a RAM 1613, an I/O unit 1614 and a communication controller 1615 for a network on the vehicle. The above devices are connected with one another via a bus 1620.

Algorithm for estimating and controlling an amount of drawn air of a cylinder, awarding to the present invention, may be stored as a program in the ROM 1611 or the flash memory 1612. Some part of the algorithm, for example fuzzy rules, may be stored in the flash memory 1612, while the other part may be stored in the ROM 1611. Alternatively, the algorithm may be stored in another type of memory not shown in the drawing.

What is claimed is:

1. A method for estimating an amount of drawn air of a cylinder of an internal combustion engine, comprising the steps of:

obtaining an estimated value of an amount of drawn air of the cylinder, based on a value of intake manifold pressure;

determining a value of an identification parameter using an adaptive observer in such a way that a product of the estimated value of an amount of drawn air of the cylinder, based on a value of intake manifold pressure and a value of the identification parameter, is made equal to a value of an amount of air having passed through the throttle; and multiplying the estimated value of an amount of drawn air of the cylinder, based on a value of intake manifold pressure, by the value of the identification parameter to obtain a final estimated value of an amount of drawn air of the cylinder.

2. A method for estimating an amount of drawn air of a cylinder according to claim 1, wherein in the step of determining an identification parameter using an adaptive observer, an amount of lift of an exhaust gas recycling valve is further used for identification.

3. A method for controlling an amount of drawn air of a cylinder of an internal combustion engine, wherein the final estimated value of an amount of drawn air of the cylinder, obtained through a method for estimating an amount of drawn air of the cylinder, according to claim 1, is controlled to a desired value.

4. A method for controlling an amount of drawn air of a cylinder, according to claim 3, wherein a response-specifying type control algorithm is employed.

5. A method for estimating an amount of drawn air of a cylinder of an internal combustion engine, comprising the steps of:

obtaining an estimated value of an amount of drawn air of the cylinder, based on a value of intake manifold pressure;

obtaining an estimated value of an amount of recycled exhaust gas based on a value of intake manifold pressure, a value corresponding to pressure inside an exhaust manifold and a value of an amount of lift of an exhaust gas recycling valve;

determining values of first and second identification parameters using an adaptive observer in such a way that a value obtained by subtracting a product of the estimated value of an amount of recycled exhaust gas and a value of the second identification parameter, from a product of the estimated value of an amount of drawn air of the cylinder, based on a value of intake manifold pressure and a value of the first identification parameter, is made equal to a value of an amount of air having passed through the throttle; and subtracting a product of the estimated value of an amount of recycled exhaust gas and the value of the second identification parameter, from a product of the estimated value of an amount of drawn air of the cylinder, based on a value of intake manifold pressure and the value of the first identification parameter, to obtain a final estimated value of an amount of drawn air of the cylinder.

6. A method for estimating an amount of drawn air of a cylinder according to claim 5, wherein in the step of determining first and second identification parameters using an adaptive observer, a forgetting factor is used for the second identification parameter.

7. A method for estimating an amount of drawn air of a cylinder of an internal combustion engine, comprising the steps of:

obtaining an estimated value of an amount of drawn air of the cylinder, based on a value of intake manifold pressure;

obtaining a difference of values of intake manifold pressure, a second-order difference of values of intake manifold pressure, a difference of values of an amount of air having passed through a throttle and a difference of estimated values of an amount of drawn air of the cylinder, based on a value of intake manifold pressure;

determining a value of an identification parameter using an adaptive observer in such a way that a product of the second-order difference of values of intake manifold pressure and a value of the identification parameter, made equal to a value obtained by subtracting the difference of estimated values of an amount of drawn air of the cylinder, based on a value of intake manifold pressure, from the difference of values of an amount of air having passed through the throttle; and subtracting a product of the difference of values of intake manifold pressure and the value of the identification parameter, from a value of an amount of air having passed through the throttle, to obtain a final estimated value of an amount of drawn air of the cylinder.

8. An apparatus for estimating an amount of drawn air of a cylinder of an internal combustion engine, comprising:

a module for obtaining an estimated value of an amount of drawn air of the cylinder, based on a value of intake manifold pressure to deliver the estimated value as an output;

a module for determining a value of an identification parameter using an adaptive observer, based on the estimated value of an amount of drawn air of the cylinder, based on a value of intake manifold pressure and an amount of air having passed through a throttle, in such a way that a product of the estimated value and a value of the identification parameter, is made equal to a value of an amount of air having passed through the throttle, to deliver a value of the identification parameter as an output; and a multiplying module for multiplying the estimated value, by the value of identification parameter to obtain a final estimated value of an amount of drawn air of the cylinder.

9. An apparatus for estimating an amount of drawn air of a cylinder according to claim 8, wherein the module for determining an identification parameter using an adaptive observer to deliver the identification parameter as an output, further receives as an input an amount of lift of a exhaust gas recycling valve and uses the amount for identification.

10. An apparatus for controlling an amount of drawn air of a cylinder, comprising:

an apparatus for estimating an amount of drawn air of a cylinder according to claim 8; and a controller receiving, as inputs, the final estimated value of the apparatus for estimating an amount of drawn air of a cylinder and a desired value of an amount of drawn air, to manipulate throttle opening in such a way that the final estimated value is controlled at the desired value.

11. An apparatus for controlling an amount of drawn air of a cylinder, according to claim 10, wherein the controller employs a response-specifying type control algorithm.

12. An apparatus for controlling an amount of drawn air of a cylinder, comprising:

an apparatus for estimating an amount of drawn air of a cylinder according to claim 8; and means for controlling an amount of drawn air, receiving, as inputs, the final estimated value of the apparatus for estimating an amount of drawn air of a cylinder and a desired value of an amount of drawn air, to manipulate throttle opening in such a way that the final estimated value is controlled at the desired value.

13. An apparatus for controlling an amount of drawn air of a cylinder, according to claim 12, wherein the controlling means employs a response-specifying type control algorithm.

14. An apparatus for estimating an amount of drawn air of a cylinder of an internal combustion engine, comprising:

a module for obtaining an estimated value of an amount of drawn air of the cylinder, based on a value of intake manifold pressure, to deliver the estimated value of an amount of drawn air, as an output;

a module for obtaining an estimated value of an amount of recycled exhaust gas based on a value of intake manifold pressure, a value corresponding to pressure inside an exhaust manifold and a value of an amount of lift of an exhaust gas recycling valve, to deliver the estimated value of an amount of recycled exhaust gas, as an output;

a module for determining first and second identification parameters using an adaptive observer in such a way that a value obtained by subtracting a product of the estimated value of an amount of recycled exhaust gas and a value of the second identification parameter, from a product of the estimated value of an amount of drawn air of the cylinder, based on a value of intake manifold pressure and a value of the first identification parameter, is made equal to a value of an amount of air having passed through the throttle, to deliver values of the first and second identification parameters as outputs; and a module for subtracting a product of the estimated value of an amount of recycled exhaust gas and the value of the second identification parameter, from a product of the estimated value of an amount of drawn air of the cylinder, based on a value of intake manifold pressure and the value of the first identification parameter, to obtain and deliver, as an output, a final estimated value of an amount of drawn air of the cylinder.

15. An apparatus for estimating an amount of drawn air of a cylinder according to claim 14, wherein in the module for determining first and second identification parameters to deliver the first and second identification parameters, as outputs, a forgetting factor is used for the second identification parameter.

16. An apparatus for estimating an amount of drawn air of a cylinder of an internal combustion engine, comprising:

a module for obtaining an estimated value of an amount of drawn air of the cylinder, based on a value of intake manifold pressure, to deliver the estimated value of an amount of drawn air, as an output;

at least one module for obtaining a difference of values of intake manifold pressure, a second-order difference of values of intake manifold pressure, a difference of values of an amount of air having passed through a throttle and a difference of estimated values of an amount of drawn air of the cylinder, based on a value of intake manifold pressure;

a module for determining a value of an identification parameter using an adaptive observer in such a way that a product of the second-order difference of values of intake manifold pressure and a value of the identification parameter, is made equal to a value obtained by subtracting the difference of estimated values of an amount of drawn air of the cylinder, based on a value of intake manifold pressure, from the difference of values of an amount of air having passed through the throttle;

a module for multiplying the difference of values of intake manifold pressure by the value of the identification parameter; and a module for subtracting a product of the difference of values of intake manifold pressure and the value of the identification parameter, from a value of an amount of air having passed through the throttle, to obtain and deliver, as an output, a final estimated value of an amount of drawn air of the cylinder.

17. A computer-readable medium having a program stored therein, the program is made to perform the steps of:

obtaining an estimated value of an amount of drawn air of the cylinder, based on a value of intake manifold pressure;

determining a value of an identification parameter using an adaptive observer in such a way that a product of the estimated value of an amount of drawn air of the cylinder, based on a value of intake manifold pressure and a value of the identification parameter, is made equal to a value of an amount of air having passed through the throttle; and multiplying the estimated value of an amount of drawn air of the cylinder, based on a value of intake manifold pressure, by a value of identification parameter to obtain a final estimated value of an amount of drawn air of the cylinder.

18. A computer-readable medium according to claim 17, wherein in the step of determining an identification parameter using an adaptive observer, an amount of lift of an exhaust gas recycling valve is further used for identification.

19. A computer-readable medium according to claim 17, wherein the program is further made to perform the step of controlling the final estimated value of an amount of drawn air of the cylinder, to a desired value.

20. A computer-readable medium according to claim 19, wherein in the program a response-specifying type control algorithm is employed.

21. A computer-readable medium having a program stored therein, the program is made to perform the steps of:

obtaining an estimated value of an amount of drawn air of the cylinder, based on a value of intake manifold pressure;

obtaining an estimated value of an amount of recycled exhaust gas based on a value of intake manifold pressure, a value corresponding to pressure inside an exhaust manifold and a value of an amount of lift of an exhaust gas recycling valve;

determining first and second identification parameters using an adaptive observer in such a way that a value obtained by subtracting a product of the estimated value of an amount of recycled exhaust gas and a value of the second identification parameter, from a product of the estimated value of an amount of drawn air of the cylinder, based on a value of intake manifold pressure and a value of the first identification parameter, is made equal to a value of an amount of air having passed through the throttle; and subtracting a product of the estimated value of an amount of recycled exhaust gas and a value of the second identification parameter, from a product of the estimated value of an amount of drawn air of the cylinder, based on a value of intake manifold pressure and a value of the first identification parameter, to obtain a final estimated value of an amount of drawn air of the cylinder.

22. A computer-readable medium according to claim 21, wherein in the step of determining first and second identification parameters using an adaptive observer, a forgetting factor is used for the second identification parameter.

23. A computer-readable medium having a program stored therein, the program is made to perform the steps of:

obtaining an estimated value of an amount of drawn air of the cylinder, based on a value of intake manifold pressure;

obtaining a difference of values of intake manifold pressure, a second-order difference of values of intake manifold pressure, a difference of values of an amount of air having passed through a throttle and a difference of estimated values of an amount of drawn air of the cylinder, based on a value of intake manifold pressure;

determining a value of an identification parameter using an adaptive observer in such a way that a product of the second-order difference of values of intake manifold pressure and a value of the identification parameter, made equal to a value obtained by subtracting the difference of estimated values of an amount of drawn air of the cylinder, based on a value of intake manifold pressure, from the difference of values of an amount of air having passed through the throttle; and subtracting a product of the difference of values of intake manifold pressure and the value of the identification parameter, from a value of an amount of air having passed through the throttle, to obtain a final estimated value of an amount of drawn air of the cylinder.

24. An apparatus for estimating an amount of drawn air of a cylinder of an internal combustion engine, comprising:

means for obtaining an estimated value of an amount of drawn air of the cylinder, based on a value of intake manifold pressure to deliver the estimated value as an output;

means for determining a value of an identification parameter using an adaptive observer, based on the estimated value of an amount of drawn air of the cylinder, based on a value of intake manifold pressure and an amount of air having passed through a throttle, in such a way that a product of the estimated value and a value of the identification parameter, is made equal to a value of an amount of air having passed through the throttle, to deliver a value of the identification parameter as an output; and means for multiplying the estimated value, by the value of identification parameter to obtain a final estimated value of an amount of drawn air of the cylinder.

25. An apparatus for estimating an amount of drawn air of a cylinder according to claim 24, wherein the means for determining an identification parameter using an adaptive observer to deliver the identification parameter as an output, further receives as an input an amount of lift of a exhaust gas recycling valve and uses the amount for identification.

26. An apparatus for estimating an amount of drawn air of a cylinder of an internal combustion engine, comprising:

means for obtaining an estimated value of an amount of drawn air of the cylinder, based on a value of intake manifold pressure, to deliver the estimated value of an amount of drawn air, as an output;

means for obtaining an estimated value of an amount of recycled exhaust gas based on a value of intake manifold pressure, a value corresponding to pressure inside an exhaust manifold and a value of an amount of lift of an exhaust gas recycling valve, to deliver the estimated value of an amount of recycled exhaust gas, as an output;

means for determining first and second identification parameters using an adaptive observer in such a way that a value obtained by subtracting a product of the estimated value of an amount of recycled exhaust gas and a value of the second identification parameter, from a product of the estimated value of an amount of drawn air of the cylinder, based on a value of intake manifold pressure and a value of the first identification parameter, is made equal to a value of an amount of air having passed through the throttle, to deliver values of the first and second identification parameters as outputs; and means for subtracting a product of the estimated value of an amount of recycled exhaust gas and the value of the second identification parameter, from a product of the estimated value of an amount of drawn air of the cylinder, based on a value of intake manifold pressure and the value of the first identification parameter, to obtain and deliver, as an output, a final estimated value of an amount of drawn air of the cylinder.

27. An apparatus for estimating an amount of drawn air of a cylinder according to claim 26, wherein in the means for determining first and second identification parameters to deliver the first and second identification parameters, as outputs, a forgetting factor is used for the second identification parameter.

28. An apparatus for estimating an amount of drawn air of a cylinder of an internal combustion engine, comprising:

means for obtaining an estimated value of an amount of drawn air of the cylinder, based on a value of intake manifold pressure, to deliver the estimated value of an amount of drawn air, as an output;

at least one means for obtaining a difference of values of intake manifold pressure, a second-order difference of values of intake manifold pressure, a difference of values of an amount of air having passed through a throttle and a difference of estimated values of an amount of drawn air of the cylinder, based on a value of intake manifold pressure;

means for determining a value of an identification parameter using an adaptive observer in such a way that a product of the second-order difference of values of intake manifold pressure and a value of the identification parameter, is made equal to a value obtained by subtracting the difference of estimated values of an amount of drawn air of the cylinder, based on a value of intake manifold pressure, from the difference of values of an amount of air having passed through the throttle;

means for multiplying the difference of values of intake manifold pressure by the value of the identification parameter; and means for subtracting a product of the difference of values of intake manifold pressure and the value of the identification parameter, from a value of an amount of air having passed through the throttle, to obtain and deliver, as an output, a final estimated value of an amount of drawn air of the cylinder.

* * * * *